(12) United States Patent
Oonishi et al.

(10) Patent No.: US 11,991,345 B2
(45) Date of Patent: May 21, 2024

(54) VIRTUAL IMAGE DISPLAY DEVICE AND HEAD MOUNTED DISPLAY USING SAME

(71) Applicant: Maxell, Ltd., Kyoto (JP)

(72) Inventors: Kunikazu Oonishi, Tokyo (JP); Seiji Murata, Tokyo (JP)

(73) Assignee: MAXELL, LTD., Kyoto (JP)

( * ) Notice: Subject to any disclaimer, the term of this patent is extended or adjusted under 35 U.S.C. 154(b) by 0 days.

(21) Appl. No.: 17/584,647

(22) Filed: Jan. 26, 2022

(65) Prior Publication Data

US 2022/0150466 A1 May 12, 2022

Related U.S. Application Data

(63) Continuation of application No. 16/758,437, filed as application No. PCT/JP2018/040257 on Oct. 30, 2018, now Pat. No. 11,297,304.

(30) Foreign Application Priority Data

Nov. 2, 2017 (JP) ................................. 2017-212339

(51) Int. Cl.
*H04N 13/383* (2018.01)
*G02B 27/01* (2006.01)
(Continued)

(52) U.S. Cl.
CPC ....... *H04N 13/383* (2018.05); *G02B 27/0101* (2013.01); *G02B 27/0172* (2013.01);
(Continued)

(58) Field of Classification Search
CPC .. H04N 13/383; H04N 13/117; H04N 13/344; H04N 13/156; H04N 13/239;
(Continued)

(56) References Cited

U.S. PATENT DOCUMENTS

2003/0071765 A1 4/2003 Suyama et al.
2005/0264882 A1 12/2005 Daiku et al.
(Continued)

FOREIGN PATENT DOCUMENTS

JP 9-322197 A 12/1997
JP 2000-261832 A 9/2000
(Continued)

OTHER PUBLICATIONS

International Search Report of PCT/JP2018/040257 dated Feb. 5, 2019.
(Continued)

*Primary Examiner* — Thai Q Tran
*Assistant Examiner* — Stephen R Smith
(74) *Attorney, Agent, or Firm* — MATTINGLY & MALUR, PC

(57) ABSTRACT

A virtual image display device has a function of projecting a prescribed virtual image video within a visual field of a user and detects an actual visual recognition distance from the user to an object relating to a visually recognized object at which the user is gazing. A virtual image light generating unit has a function of generating a plurality of virtual image lights independent of each other and a virtual-image-light transmitting and projecting unit that has a function of transmitting and projecting the virtual image light to left and right eyes of the user through substantially the same optical path to allow a prescribed virtual image video to be visually recognized at a prescribed position within the visual field of the user. Additionally, a virtual-image visual recognition distance control unit that has a function of performing variable control of a visual recognition distance of a virtual image.

9 Claims, 17 Drawing Sheets

(51) Int. Cl.
*G02B 27/10* (2006.01)
*H04N 13/117* (2018.01)
*H04N 13/344* (2018.01)

(52) U.S. Cl.
CPC ......... *G02B 27/0179* (2013.01); *G02B 27/10* (2013.01); *H04N 13/117* (2018.05); *H04N 13/344* (2018.05); *G02B 2027/0129* (2013.01); *G02B 2027/0174* (2013.01); *G02B 2027/0178* (2013.01); *G02B 2027/0185* (2013.01)

(58) Field of Classification Search
CPC ............ G02B 27/0101; G02B 27/0172; G02B 27/0179; G02B 27/10; G02B 27/0093; G02B 27/017; G02B 2027/0129; G02B 2027/0174; G02B 2027/0178; G02B 2027/0185; G02B 2027/0138; G09G 5/00; G09G 5/36; G09G 5/38
USPC .......................... 348/51; 345/6, 8, 633, 656
See application file for complete search history.

(56) References Cited

U.S. PATENT DOCUMENTS

| | | | |
|---|---|---|---|
| 2008/0151379 | A1 | 6/2008 | Amitai et al. |
| 2010/0321409 | A1 | 12/2010 | Komori |
| 2013/0278631 | A1 | 10/2013 | Border |
| 2015/0363979 | A1 | 12/2015 | Takano et al. |
| 2016/0202487 | A1 | 7/2016 | Iguchi |
| 2016/0284129 | A1 | 9/2016 | Nishizawa et al. |
| 2018/0004002 | A1 | 1/2018 | Rong |
| 2018/0164599 | A1 | 6/2018 | Hu |
| 2018/0190011 | A1* | 7/2018 | Platt ..................... G02B 27/017 |
| 2018/0288359 | A1* | 10/2018 | Komatsu ............ G02B 27/0955 |
| 2019/0018247 | A1 | 1/2019 | Gao |
| 2019/0094981 | A1* | 3/2019 | Bradski ................ H04N 21/414 |
| 2019/0121132 | A1 | 4/2019 | Shamir |
| 2019/0278093 | A1 | 9/2019 | Osterhout |
| 2020/0319468 | A1 | 10/2020 | Kobayashi |
| 2020/0368616 | A1 | 11/2020 | Delamont |

FOREIGN PATENT DOCUMENTS

| | | | |
|---|---|---|---|
| JP | 2001-21853 | A | 1/2001 |
| JP | 2004-294848 | A | 10/2004 |
| JP | 2004294848 | A * | 10/2004 |
| JP | 2005-107038 | A | 4/2005 |
| JP | 2005-338346 | A | 12/2005 |
| JP | 2008-533507 | A | 8/2008 |
| JP | 2010-271565 | A | 12/2010 |
| JP | 2010271565 | A * | 12/2010 |
| JP | 2011-2778 | A | 1/2011 |
| JP | 2011-28141 | A | 2/2011 |
| JP | 2011028141 | A * | 2/2011 |
| JP | 2013-55383 | A | 3/2013 |
| JP | 2015-55638 | A | 3/2015 |
| JP | 2015-84150 | A | 4/2015 |
| JP | 2015-99184 | A | 5/2015 |
| JP | 2015-228095 | A | 12/2015 |
| JP | 2016-186561 | A | 10/2016 |
| WO | 2016/203654 | A1 | 12/2016 |

OTHER PUBLICATIONS

Japanese Office Action received in corresponding Japanese Application No. 2022-032221 dated Dec. 27, 2022.

* cited by examiner

F I G. 1 5
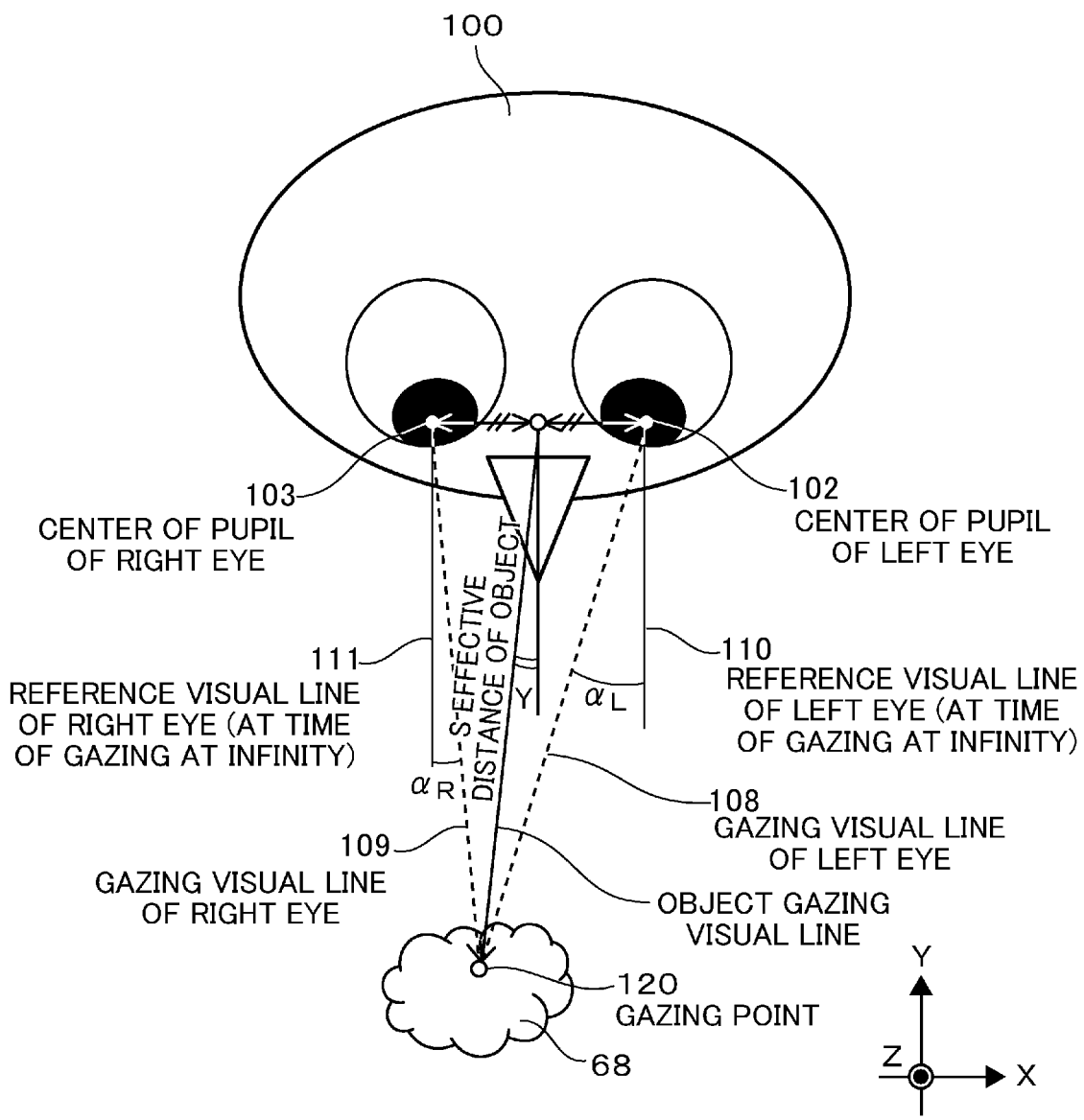

FIG. 17
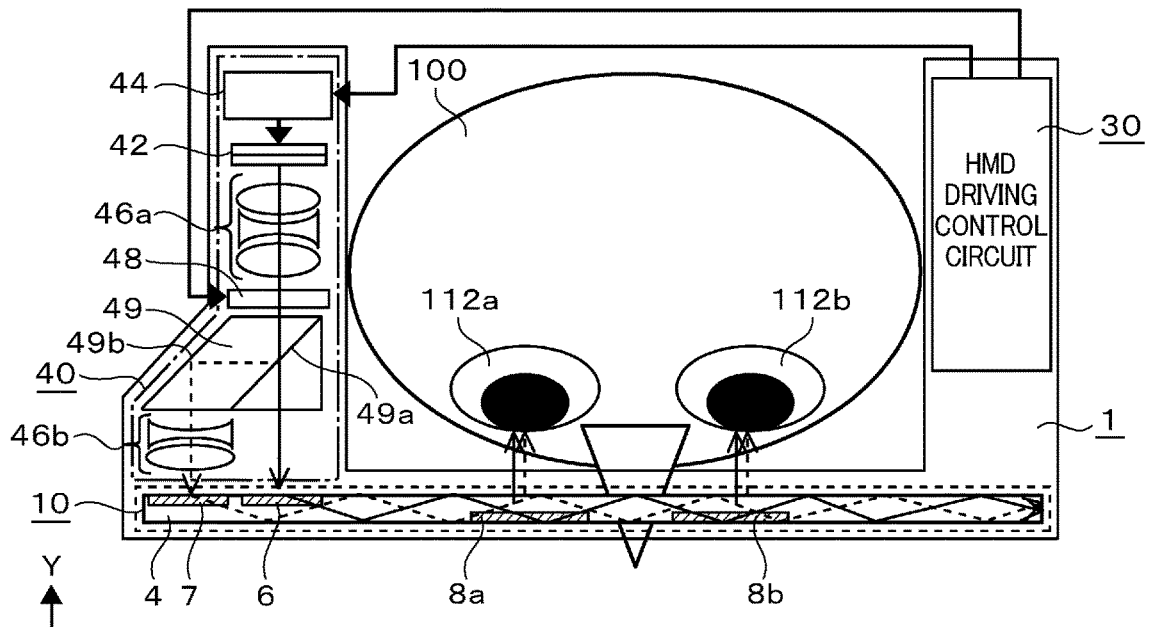
FIG. 18
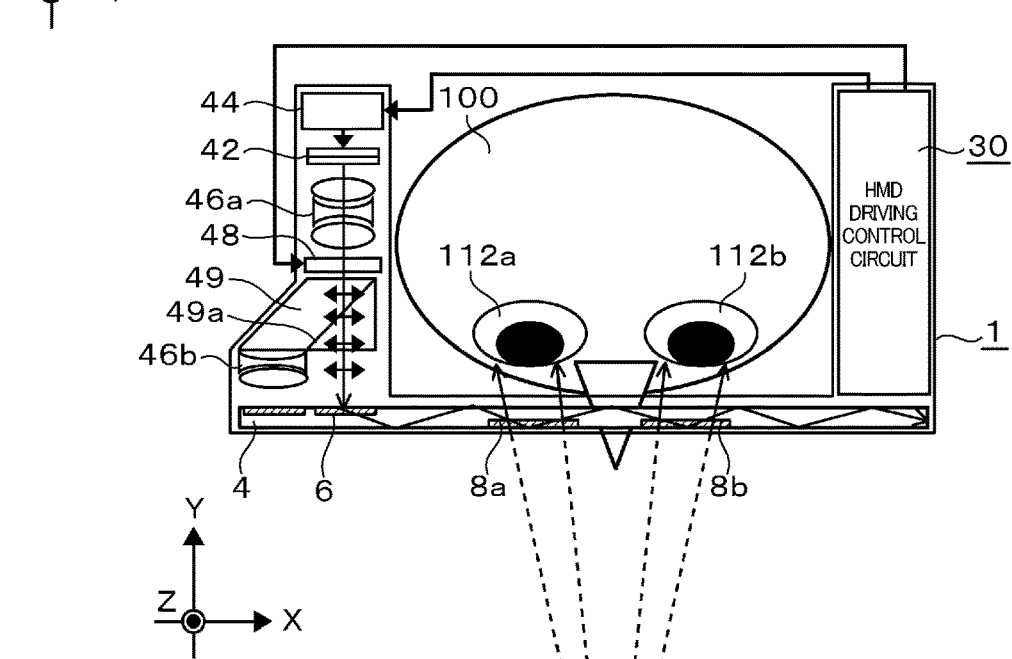
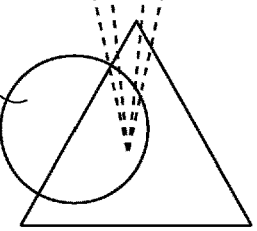
LONG DISTANCE
REFERENCE
VIRTUAL IMAGE

VIRTUAL IMAGE DISPLAY DEVICE AND HEAD MOUNTED DISPLAY USING SAME

TECHNICAL FIELD

The present invention relates to a virtual image display device having a function of allowing a user to visually recognize an arbitrary video as a virtual image by a prescribed optical system, and particularly, to a virtual image display device having a function of superimposing and displaying a virtual image in an actual space visual field which is visually recognized by the user.

BACKGROUND ART

As examples of a virtual image display device having a function of superimposing and displaying a prescribed virtual image in an actual space visual field visually recognized by a user, there are known a head mounted display (hereinafter, referred to as an HMD) and a head-up display (hereinafter, referred to as an HUD), and the like. In these virtual image display devices, the presence or absence of a function of adapting a visual recognition distance of a virtual image superimposed and displayed in an actual space visual field of a user to an actual space visual recognition distance of an actual object within the visual field (hereinafter, referred to as a virtual-image visual recognition distance adapting function) is an important performance requirement that reduces the physiological burden on the user and contributes to improving the visibility of the user.

In the related art, as a means for realizing the virtual-image visual recognition distance adapting function in the HMD particularly mounted on the head of the user, for example, Patent Document 1 discloses a virtual-image visual recognition distance adapting unit using a so-called "binocular parallax method" that detects a visual recognition distance (actual visual recognition distance) to an actual space object at which the user is gazing by a prescribed detecting unit, and causes illusion to the user as if the virtual-image visual recognition distance is adapted to the actual space visual recognition distance by applying the amount of relative deviation, that is, "binocular parallax", between the left-eye visually recognized image and the right-eye visually recognized image of the user generated when the user is gazing at the object at the actual visual recognition distance to the left-eye display virtual image that can be visually recognized only with the left eye of the user and the right-eye display virtual image that can be visually recognized only with the right eye.

CITATION LIST

Patent Document

Patent Document 1: JP 2016-186561 A

SUMMARY OF THE INVENTION

Problems to be Solved by the Invention

However, in the virtual-image visual recognition distance adapting unit according to the "binocular parallax method" as disclosed in Patent Document 1, since there is a difference between the perceived virtual image distance perceived by the user due to the binocular parallax and the distance at which the eyes of the user focus on the virtual image, that is, the actual virtual image distance, there is a problem that a physiological burden is imposed on the user, and the user feels great fatigue in the case of long-term use. In addition, since the binocular parallax itself changes depending on the gazing line direction of the user in addition to the visual recognition distance, there is also a problem that the viewpoint range of the user in which the virtual image can be correctly visually recognized at a prescribed visual recognition distance, that is, so-called eyebox is extremely narrow. Furthermore, in the "binocular parallax method", since different virtual images in which the positions of display video items for the left eye and the right eye are shifted need be displayed, two independent virtual-image display optical systems for the left eye and the right eye are necessarily provided in the HMD, so that there are great restrictions on reducing the size and weight of the HMD and reducing the cost.

An object of the present invention based on the above-described background is to satisfactorily improve the above-mentioned problems of a physiological burden on the user and narrowness of the viewpoint range.

Solutions to Problems

In consideration of the background art and problems described above, the present invention provides, for example, a virtual image display device having a function of projecting a prescribed virtual image video within a visual field of a user configured to include: a visual recognition distance detecting unit that detects an actual visual recognition distance from the user to an object relating to a visually recognized object at which the user is gazing or at least a portion of a plurality of objects within the visual field; a virtual image light generating unit that has a function of generating a plurality of virtual image lights independent of each other; a virtual-image-light transmitting and projecting unit that has a function of transmitting and projecting the virtual image light to left and right eyes of the user through substantially the same optical path to allow a prescribed virtual image video to be visually recognized at a prescribed position within the visual field of the user; and a virtual-image visual recognition distance control unit that has a function of performing variable control of a visual recognition distance of a virtual image visually recognized by the user by using the plurality of projected virtual image lights.

Effects of the Invention

According to the present invention, it is possible to provide a virtual image display device capable of implementing a virtual-image visual recognition distance adapting function under favorable visual recognition environment in which a physiological burden of a user is reduced and a head mounted display using the same.

BRIEF DESCRIPTION OF THE DRAWINGS

FIG. 15 is a schematic view for describing an operation principle of a visually-recognized-object actual visual recognition distance detecting unit of an HMD according to a second embodiment.

FIG. 17 is a plan view illustrating a schematic configuration of a virtual image light generating unit and a virtual-image-light transmitting and projecting unit of an HMD according to a third embodiment.

FIG. 18 is a schematic view for describing an operation outline of the virtual image light generating unit and the virtual-image-light transmitting and projecting unit of the HMD according to the third embodiment.

MODE FOR CARRYING OUT THE INVENTION

Hereinafter, embodiments of the present invention will be described with reference to the drawings.

First Embodiment

Figure 1:
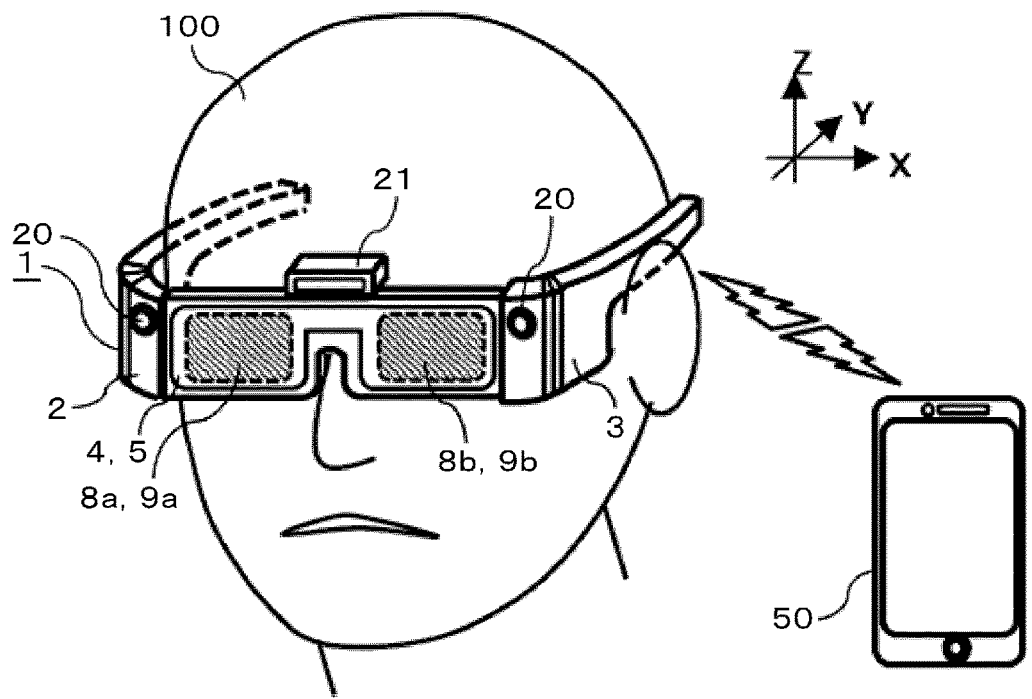
FIG. 1 is a schematic perspective view of an HMD according to a first embodiment.

FIG. 1 is a schematic perspective view of a glasses-type HMD which is a virtual image display device according to the present embodiment. As illustrated in FIG. 1, the glasses-type HMD 1 is worn on the head of a user 100. The HMD 1 stores electronic circuits and an optical engine, which will be described later, in portions 2 and 3 corresponding to temples of the glasses to be put on the left and right ears. In addition, transparent thin plates 4 and 5 made of an optical glass or plastic member for optical components are arranged in portions corresponding to eyeglass lenses. The transparent thin plates 4 and 5 are optical devices called "light-guiding plates". The present embodiment has a structure in which the light-guiding plates 4 and 5 are laminated, and the portions corresponding to the left and right eyeglass lenses are covered with the same light-guiding plate. Furthermore, prescribed outgoing holograms 8a, 8b, 9a, and 9b are arranged on the light-guiding plates 4 and 5 at portions in front of the left and right eyes. In addition, the details of the functions and the like of the light-guiding plates 4 and 5 and the outgoing holograms 8a, 8b, 9a, and 9b will be described later.

In addition, in the present embodiment, a compact electronic camera 20 for photographing an outside scene video in front of the eyes of the user is provided at the temple portions 2 and 3. In particular, in the present embodiment, the compact electronic camera 20 is a binocular camera attached to both the right and left temple portions 2 and 3 and is also configured to have a function of measuring a distance to an object by a so-called stereo camera function. However, the outside scene photographing camera mounted on the HMD as described in the present embodiment is not limited to the binocular stereo camera described above, but needless to say, a single-lens camera may be used. The installation position is not limited to the position as illustrated in FIG. 1.

In addition, in the present embodiment, a prescribed sensor box 21 is arranged above the eyeglass frame. In the present sensor box 21, a sensor to measure a distance to an arbitrary object in front of the eyes of the user such as a so-called eye tracking camera or a time-of-flight (TOF) sensor that monitors the positions of the pupils of the left and right eyes of the user 100 is installed. In addition, needless to say, the sensors provided in the sensor box 21 are not limited to the eye tracking camera and the TOF sensor, but any sensor may be used as long as the sensor is a sensor that detects an information signal or the like necessary for detecting the distance information by a function or a prescribed means of measuring the distance to an arbitrary object in the outside scene in front of the eyes of the user. In addition, the installation position of the sensor box 21 itself is not limited to the position illustrated in the drawing. In other words, in terms of configuration, for example, the sensor box itself may be eliminated, and for example, individual sensors may be incorporated at prescribed positions inside the HMD 1.

By the way, in the present embodiment, in terms of the structure, the HMD 1 has a function of performing mutual wireless communication with a portable information terminal 50 carried by the user such as a smartphone and acquiring data relating to a prescribed virtual image video to be displayed by the HMD 1 from the portable information terminal 50. However, the structure is not limited to the above-described structure. For example, in terms of the structure, the HMD itself has some or all of the functions of the portable information terminal 50, and the data relating to a virtual image to be displayed may be retained inside the HMD 1. Hereinafter, the configuration and the like of the HMD 1 according to the present embodiment will be described in detail.

In addition, prior to specific description of the present embodiment, in order to further clarify the function to be realized by the virtual image display device according to the present embodiment, example of scenes using an HMD using the virtual image display device according to the present embodiment in a daily life by a user are introduced.

Figure 2:
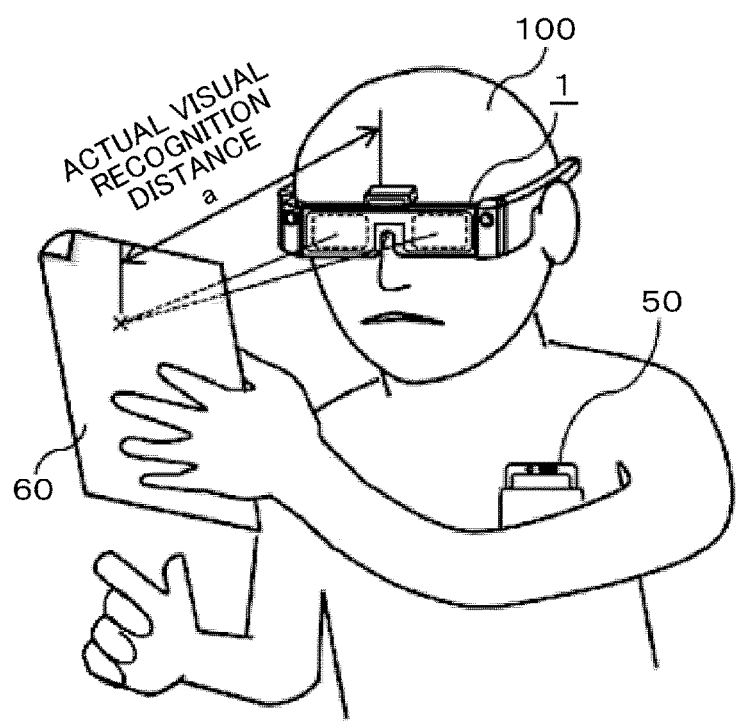
FIG. 2 is a schematic perspective view illustrating a use scene of the HMD according to the first embodiment.
Figure 3:
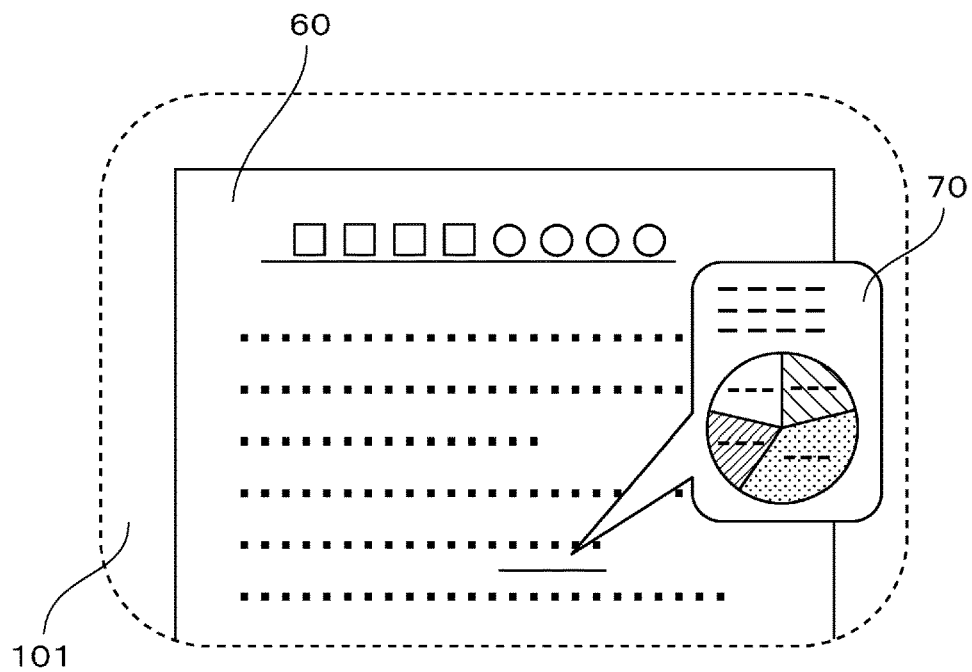
FIG. 3 is a schematic plan view illustrating an example of a visually recognized image within a visual field of a user in the use scene of FIG. 2.

For example, FIG. 2 is a schematic perspective view illustrating a scene in which the user 100 wearing the HMD 1 according to the present invention is gazing at a document 60 held in the hand, and FIG. 3 illustrates an example of an actual visually recognized image of the document 60 visually recognized within a visual field 101 (an area surrounded by a broken line) of the user 100 and a virtual image video 70 superimposed and displayed within the same visual field 101 by the HMD 1. At this time, needless to say, the two eyes of the user 100 are in focus on the document 60 held with the hands, and the visual recognition distance "a" is at most about several tens of centimeters. In such a use scene, for example, in a case where related information or commentary information on some document described on the document 60 is superimposed and displayed as a virtual image video 70 at a prescribed position within the visual field 101 by the HMD 1, the visual recognition distance of the virtual image video 70 needs to be allowed to be substantially matched with at least the visual recognition distance "a" at which the two eyes of the user 100 are in focus at that time. This is because, in a case where the two visual recognition distances do not match with each other, video items having different visual recognition distances, that is, different distances at which the eyes are in focus exist within the visual field of the user 100 at the same time, and thus, it is difficult for the user of the HMD to visually recognize these items simultaneously without discomfort or stress.

Figure 4:
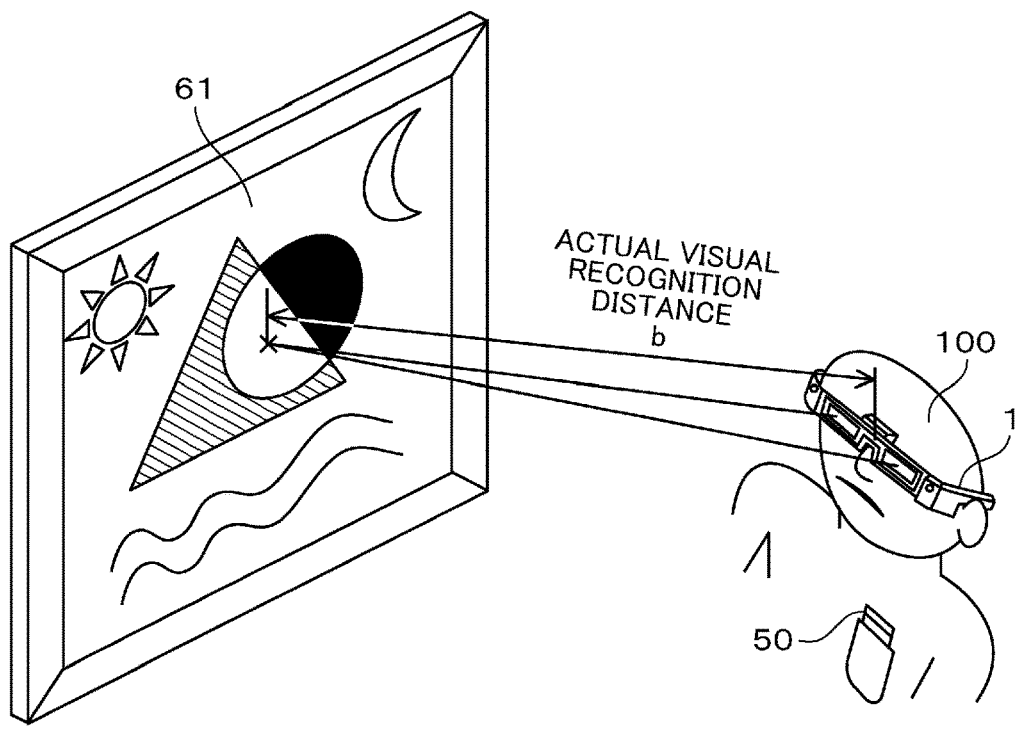
FIG. 4 is a schematic perspective view illustrating another use scene of the HMD according to the first embodiment.
Figure 5:
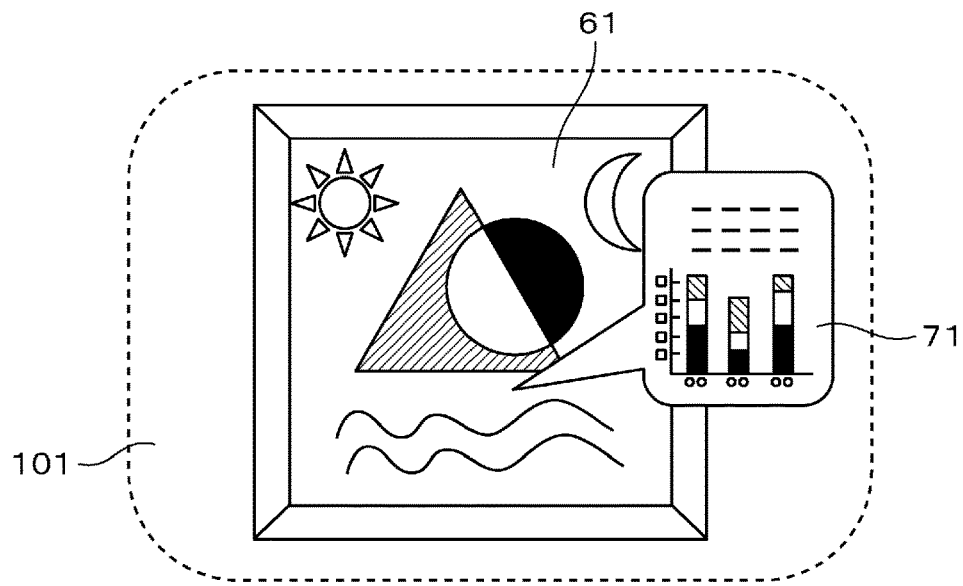
FIG. 5 is a schematic plan view illustrating an example of a visually recognized image within a visual field of a user in the use scene of FIG. 4.

Similarly, for example, FIG. 4 is a schematic perspective view illustrating a scene in which the user 100 wearing the HMD 1 is gazing at a prescribed object 61 (painting in an example of FIG. 4) from a position several meters away, and FIG. 5 illustrates an example of actual visually recognized image of the object 61 visually recognized within the visual field 101 (an area surrounded by a broken line) of the user 100 at that time and a virtual image video 71 superimposed and displayed within the same visual field 101 by the HMD 1. Also in this scene, similarly to the above-mentioned document gazing scene, two eyes of the user 100 are in focus on the visually recognized object 61, but the visual recognition distance "b" extends to several meters unlike the case of document gazing. In such a use scene, for example, in a case where related information or commentary information on the object 61 is superimposed and displayed as the virtual image video 71 by the HMD 1 at a prescribed position within the visual field 101, if the visual recognition distance of the virtual image video 71 is not allowed to be substantially matched with the visual recognition distance "b" at which the two eyes of the user 100 are in focus, it is difficult for the user 100 to visually recognize simultaneously the virtual image video 71 and the object 61 without discomfort or stress.

As described above, in order for the HMD user to simultaneously visually recognize the actual image viewed within the visual field and the virtual image video superimposed and displayed by the HMD without discomfort or stress, the visual recognition distance of the virtual image video superimposed and displayed by the HMD needs to be allowed to be substantially matched with the visual recognition distance of the object that the user is actually visually recognized at the time.

In addition, in order to realize a so-called augmented reality (AR) visual environment using the HMD, with respect to at least an arbitrary object that is visible within the visual field of the user of the HMD, since it is necessary to superimpose and display a prescribed virtual video as a virtual image in association with the virtual image, it is necessary to allow the visual recognition distance of the virtual video to be substantially matched with the actual visual recognition distance of the object or to display the video at a prescribed visual recognition distance associated with the actual visual recognition distance.

Figure 6:
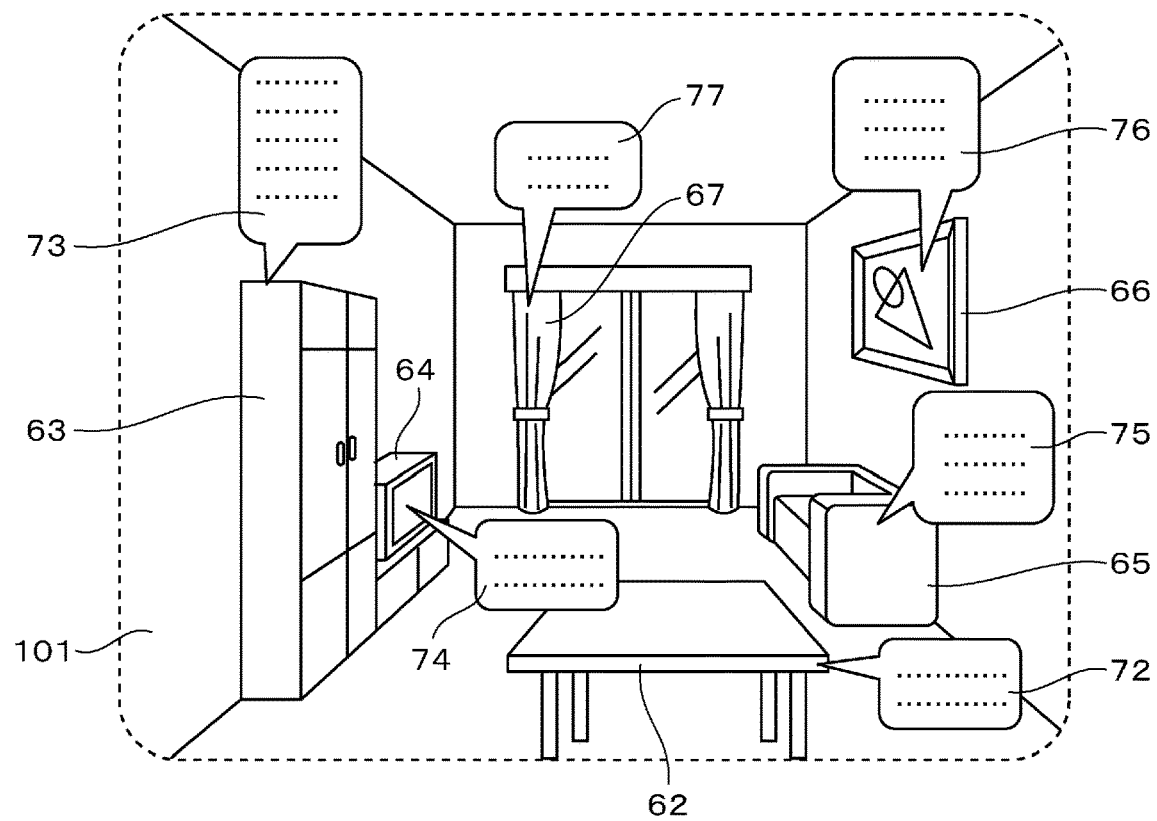
FIG. 6 is a schematic plan view illustrating a visual recognition state within a visual field of a user in still another use scene of the HMD in the first embodiment.

For example, FIG. 6 illustrates an example of actual visually recognizable objects that can be seen within the visual field when the user of the HMD overlooks the interior of a room, but needless to say, furniture items 62 to 67 in the interior of the room such as a table 62, a sofa 65, and a curtain 67 have different visual recognition distances depending on the installation position and the standing position of the user at that time. In addition, the visual recognition distance changes sequentially according to a change in the standing position of the user. Therefore, for example, in the case of realizing an AR environment by superimposing and displaying some virtual videos 72 to 77 as virtual image videos by using HMD on each of these furniture items, it is necessary to sequentially detect the actual visual recognition distances of the individual furniture items, and to allow the visual recognition distance of the corresponding virtual video to be substantially matched with the detected actual visual recognition distance or to display the video at a prescribed visual recognition distance associated with the actual visual recognition distance.

In order to meet the necessity as described above, in the present embodiment, provided is a virtual image display device such as an HMD having a function of sequentially detecting the actual visual recognition distances of the objects which the user is gazing at or the objects which are visible within the visual field of the user and displaying a prescribed virtual image video at a prescribed visual recognition distance substantially equal to or associated with the actual visual recognition distance in substantially real time.

In addition, in FIGS. 3, 5, and 6, for the better understanding of the description, examples of the virtual image video items superimposed and displayed within the visual field of the user by the HMD are limited to the information display items in a so-called "speech balloon" mode, but needless to say, the display-virtual-image video item is not limited to such a "speech balloon" mode, but a video item in any mode may be used.

Figure 7:
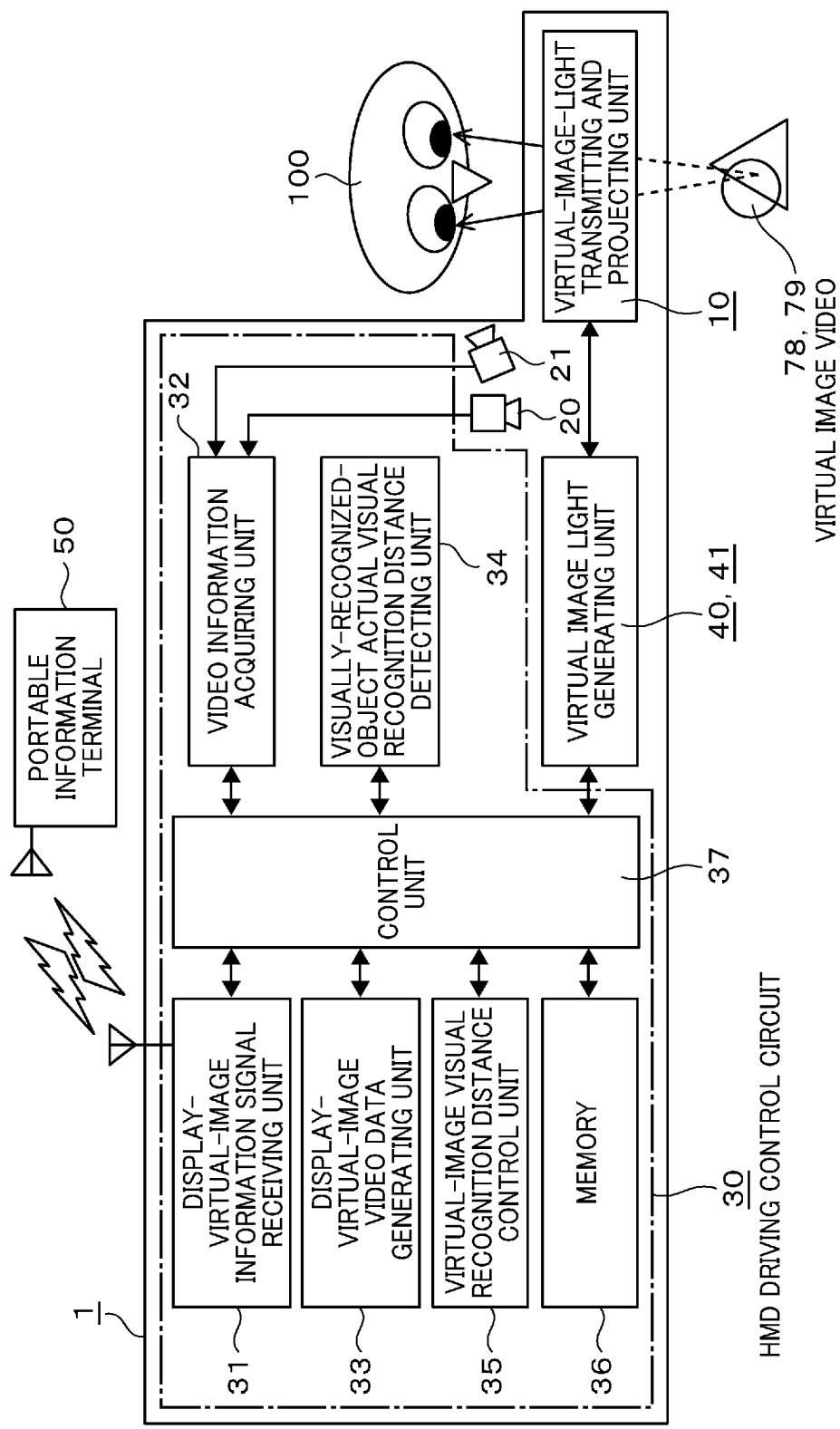
FIG. 7 is a block diagram illustrating a schematic configuration of the HMD according to the first embodiment.

Next, a specific configuration of the HMD illustrated in FIG. 1 in the present embodiment will be described. FIG. 7 is a block diagram illustrating a schematic configuration of the HMD 1 according to the present embodiment. In FIG. 7, a display-virtual-image information signal receiving unit 31 receives necessary data relating to the virtual image videos to be superimposed and displayed by using the HMD 1 by mutual communication with the portable information terminal 50 carried by the user 100. In addition, at the same time, a video information acquiring unit 32 acquires an outside scene video in front of the eyes of the user photographed by the compact electronic camera 20 for photographing an outside scene video and videos of pupils of the two eyes of the user 100 photographed by the eye tracking camera or the like in the sensor box 21 as prescribed video data. Then, a display-virtual-image video data generating unit 33 generates a display video data for generating the virtual image video 78 or 79 to be superimposed and displayed within the visual field of the user on the basis of the virtual image video data received by the display-virtual-image information signal receiving unit 31 and the prescribed video data acquired by the video information acquiring unit 32.

On the other hand, the visually-recognized-object actual visual recognition distance detecting unit 34 sequentially detects the actual visual recognition distance of the user 100 by using a prescribed means. In addition, the virtual-image visual recognition distance control unit 35 performs a prescribed control process for performing variable control of the visual recognition distance of the display virtual image on the basis of the actual visual recognition distance detected by the visually-recognized-object actual visual recognition distance detecting unit 34. In addition, the detection of the actual visual recognition distance by the visually-recognized-object actual visual recognition distance detecting unit 34 and the variable control of the visual recognition distance of the display virtual image by the virtual-image visual recognition distance control unit 35 will be described later.

Next, the memory 36 has a function of temporarily storing at least a portion of various data signals generated in the respective blocks. However, the memory 36 does not necessarily have to be arranged in the HMD 1, but for example, a memory having a similar function may be arranged on the portable information terminal 50 side. In addition, the operations of the blocks 31 to 36 are appropriately controlled by the control unit 37.

In addition, the respective blocks from the display-virtual-image information signal receiving unit 31 to the control unit 37 (the blocks within the region surrounded by a one-dot dashed line in the drawing) are blocks configured only with electronic circuits, and for the simplification of the following description, the blocks are collectively denoted as an HMD driving control circuit 30.

On the other hand, each of the virtual image light generating units 40 and 41 is configured with a prescribed virtual image video display, a driving circuit (display driver) for the display, and a prescribed optical system. The virtual-image-light transmitting and projecting unit 10 following the units is configured with only prescribed optical components and has a function of transmitting and projecting the virtual image light to the left and right eyes of the user passing through substantially the same optical path to allow the user to visually recognize a prescribed virtual image video at a prescribed position within the visual field of the user. In addition, specific configuration examples of the virtual image light generating units 40 and 41 and the virtual-image-light transmitting and projecting unit 10 will also be described later.

Figure 8:
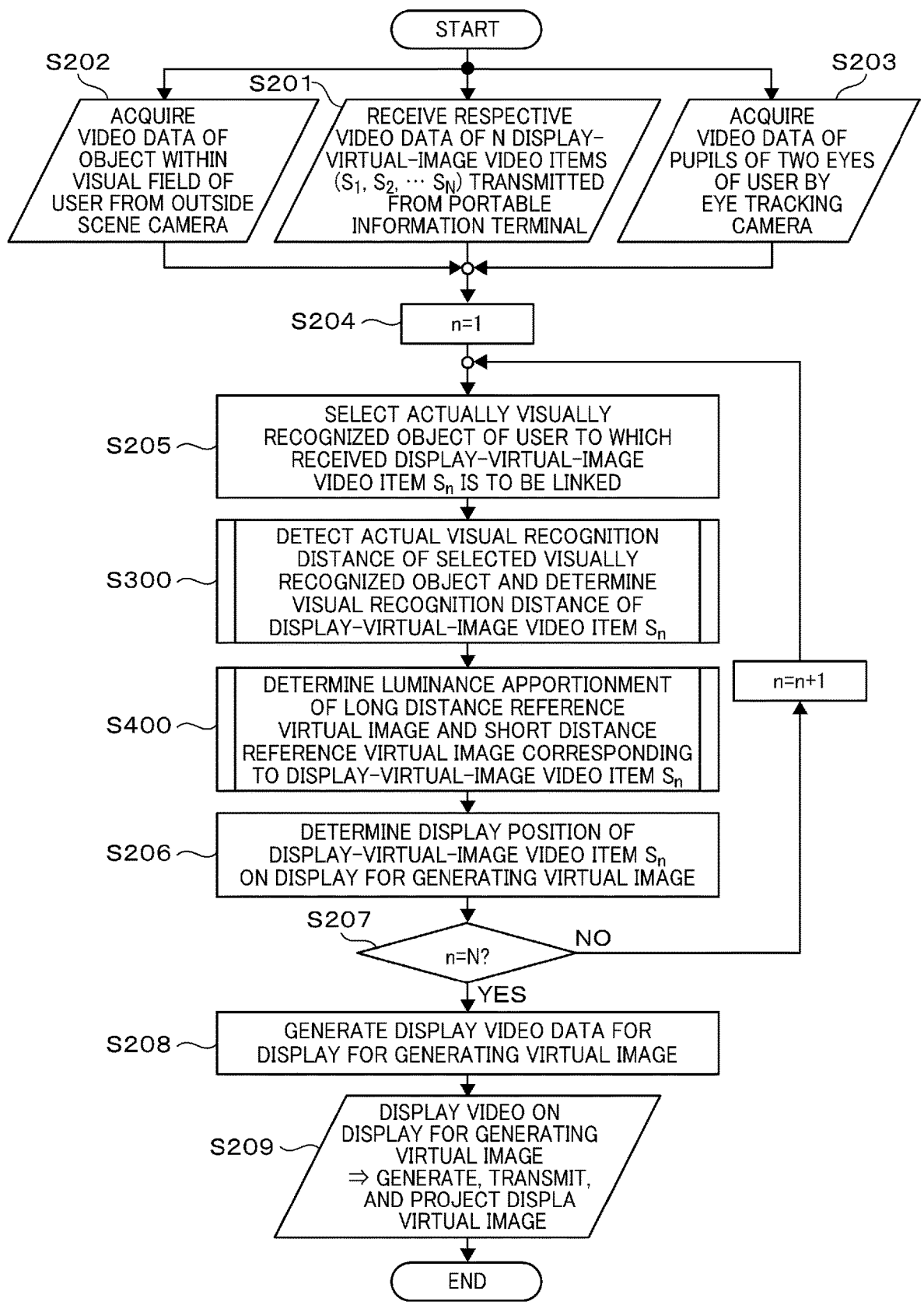
FIG. 8 is a flowchart illustrating an operation procedure of the HMD according to the first embodiment.

FIG. 8 is a flowchart illustrating the operation procedure of the HMD according to the present embodiment illustrated in FIGS. 1 and 7. In FIG. 8, after the flow is started, first, in step 201 (hereinafter, steps are referred to as S in the drawing and described as S201), respective video data of N display-virtual-image video items ($S_1$, $S_2$, ... $S_N$) transmitted from the portable information terminal 50 are received. At the same time, in step 202, each video data of an actual object within the visual field of the user is acquired from the outside scene video in front of the eyes of the user photographed by the compact electronic camera 20 for photographing an outside scene video. Furthermore, in step 203, video data of the pupils of the two eyes of the user is acquired by an eye tracking camera or the like.

Next, in step 204, a prescribed number variable n is set to 1, and in next step 205, an object to which the received n-th display-virtual-image video item Sn is to be linked and displayed is selected among the video data of the actual object within the visual field acquired in step 202. Then, in a next subprogram 300 (S300), the actual visual recognition distance of the object is detected by means described later, and the visual recognition distance of the display-virtual-image video item Sn is determined. Furthermore, in a next subprogram 400 (S400), as data necessary for the prescribed control means used in the present embodiment to perform the variable control of the visual recognition distance of the display-virtual-image video item Sn, a luminance apportionment data of a long distance reference virtual image and a short distance reference virtual image is calculated. The details of the long and short distance reference virtual images and the virtual-image visual recognition distance variable control based on the luminance apportionment will be described later.

Next, in step 206, video display data such as a display position and a display size of the display-virtual-image video item Sn on the virtual image video display is determined. Then, in step 207, it is determined whether or not n=N, and in the case of "not", n=n+1 is fed back to step 205.

By repeating the above-described processing flow, the above-described video display data and the above-described long-and-short distance reference virtual image luminance apportionment data are determined for all of the received N display-virtual-image video items ($S_1$, $S_2$, ... $S_N$).

After that, in step 208, the video data signal to be input to virtual image video display is generated by using the video display data and the long-and-short distance reference virtual image luminance apportionment data relating to each of the determined N display-virtual-image video items ($S_1$, $S_2$, ... $S_N$) and, in next step 209, the virtual image video display is actually driven to perform prescribed video display. Then, by further passing through a prescribed optical system, prescribed long and short distance reference virtual image light is generated from the video light emitted from the display, and the virtual image light is transmitted and projected to two eyes of the user.

Next, a specific example of actual visual recognition distance detection of the visually recognized object of the user executed by the subprogram 300 (S300) in the flowchart of FIG. 8 will be described.

Figure 9:
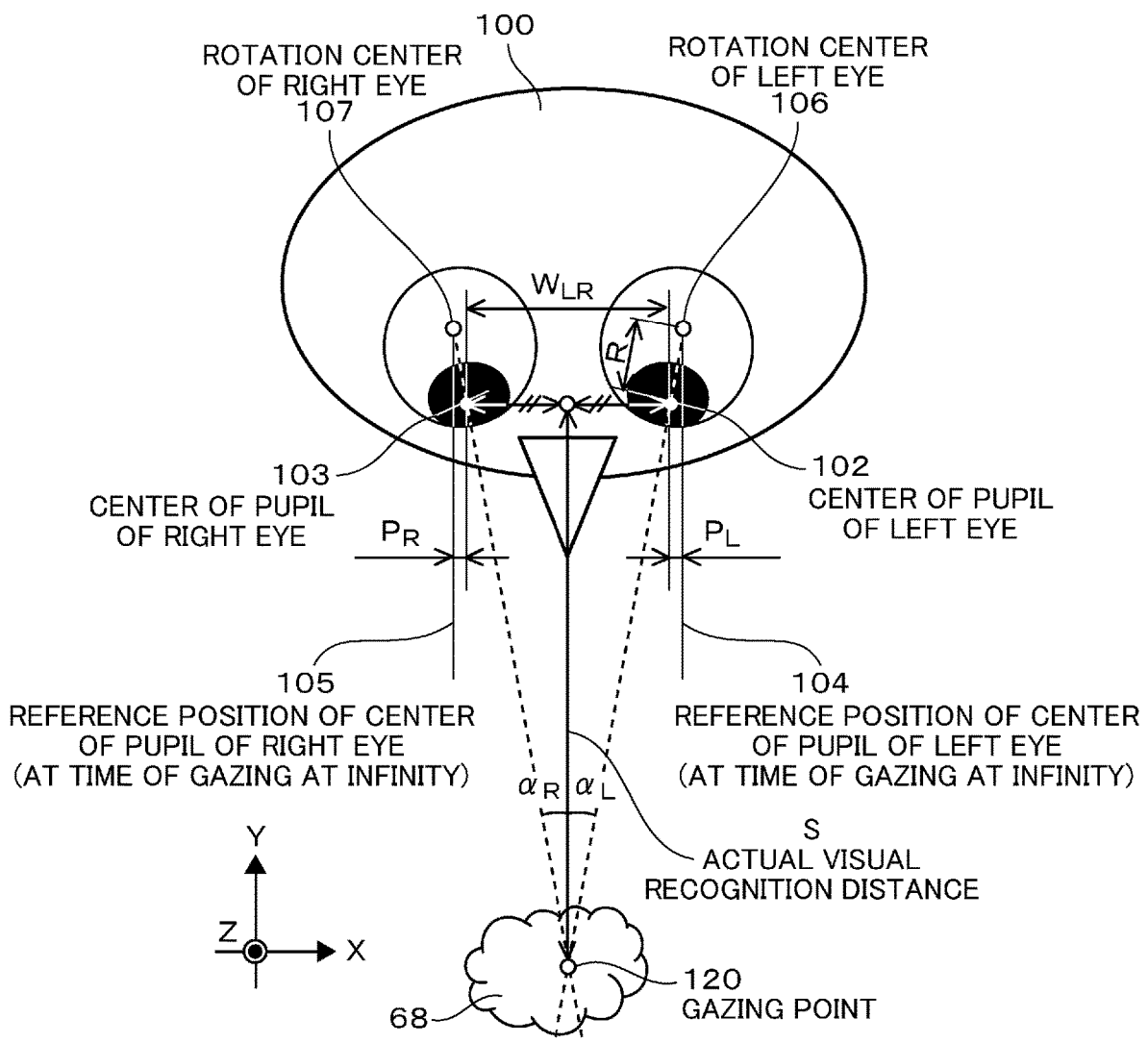
FIG. 9 is a schematic view for describing an operation principle of a visually-recognized-object actual visual recognition distance detecting unit of the HMD according to the first embodiment.
Figure 10:
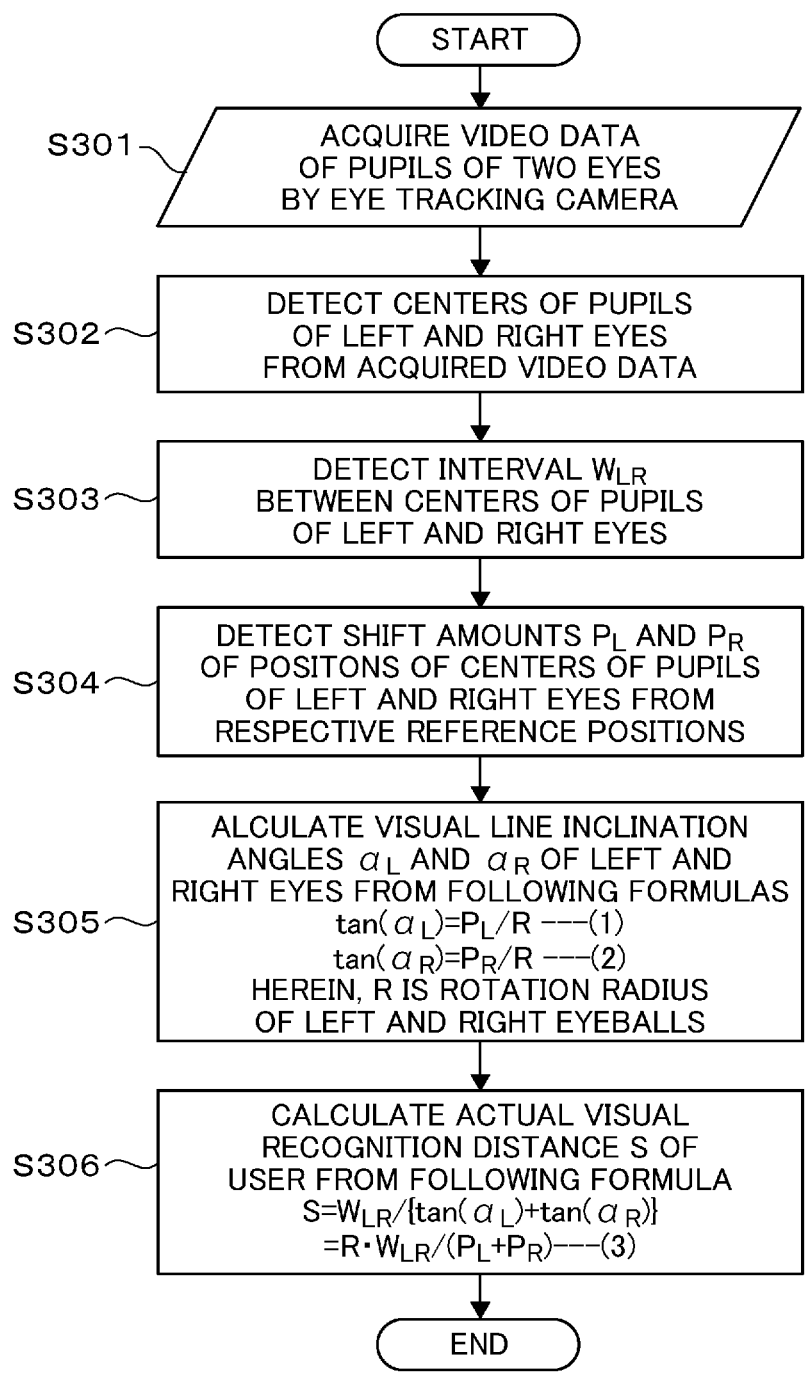
FIG. 10 is a flowchart illustrating an operation procedure of the visually-recognized-object actual visual recognition distance detecting unit of the HMD according to the first embodiment.

FIG. 9 and FIG. 10 are a schematic view and a flowchart for describing the detection procedure and principle of the actual visual recognition distance. First, the pupils of the two eyes of the user 100 are photographed by using an eye tracking camera or the like, and shift amounts from the reference positons (pupil center positions at the time of gazing at infinity) 104 and 105 of centers of pupils of left and right eyes 102 and 103, so-called convergence amounts $P_L$ and $P_R$, and an interval $W_{LR}$ between the centers of pupils of the left and right eyes at that time are detected from the video data.

Now, when the distance from the rotation centers 106 and 107 of the left and right eyeballs to the centers of pupils of left and right eyes 102 and 103, that is, the eyeball rotation radius is denoted by R, the visual line inclination angles $\alpha_L$ and $\alpha_R$ of the left and right eyes of the user 100 toward a gazing point 120 on an arbitrary visually recognized object 68 are obtained by the following Relational Formulas (1) and (2).

$$\tan(\alpha_L) = P_L/R \quad (1)$$

$$\tan(\alpha_R) = P_R/R \quad (2)$$

Furthermore, the distance from the center position of the left-right pupil interval of the user 100 to the gazing point 120, that is, the actual visual recognition distance S is also obtained by the following Relational Formula (3).

$$S = W_{LR}/\{\tan(\alpha_L) + \tan(\alpha_R)\} = R \times W_{LR}/\{P_L + P_R\} \quad (3)$$

By sequentially executing such a processing procedure, the actual visual recognition distance to the object visually recognized by the user 100 can be detected in substantially real time.

In addition, the individual processing procedures in processing steps S301 to S306 in the flowchart of FIG. 10 overlap with those in the above description, and thus, the description will be omitted.

In addition, the eyeball rotation radius R may be detected before use by a prescribed calibration process (a similar detection procedure is performed by using a calibration object having a known actual visual recognition distance, and the eyeball rotation radius is calculated by reversely calculating the above-described Formulas (1) to (3)).

Next, the specific configuration of the virtual image light generating units 40 and 41 and the virtual-image-light transmitting and projecting unit 10 in the block diagram of FIG. 7 and the specific embodiment of the visual recognition distance variable control of the virtual image video superimposed and displayed within the visual field of the user by the virtual image light generating units 40 and 41 and the virtual-image-light transmitting and projecting unit 10 will be described.

Figure 11:
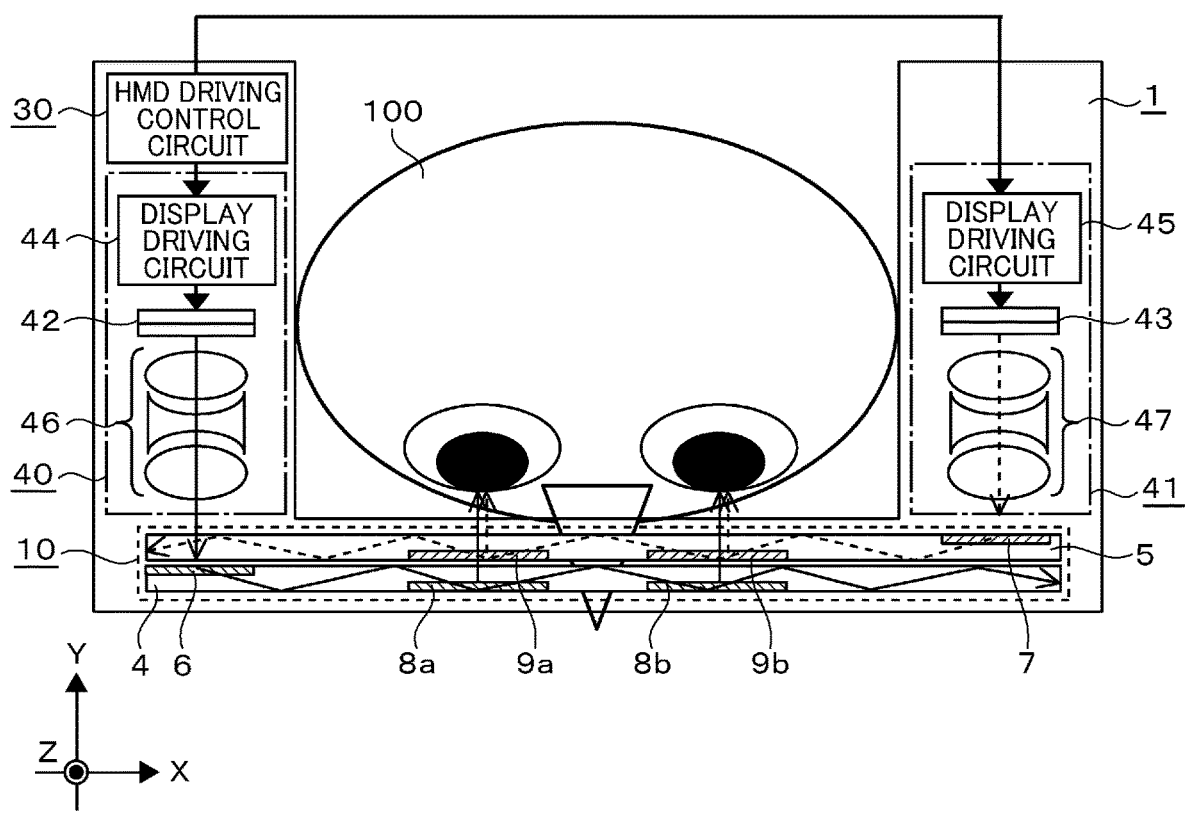
FIG. 11 is a plan view illustrating a schematic configuration of a virtual image light generating unit and a virtual-image-light transmitting and projecting unit of the HMD according to the first embodiment.

FIG. 11 is a plan view illustrating a schematic configuration of the virtual image light generating units 40 and 41 and the virtual-image-light transmitting and projecting unit 10 of the HMD according to the present embodiment illustrated in FIGS. 1 and 7. In the portion corresponding to the temples of the glasses of the HMD 1 illustrated in FIG. 1, the driving control circuit 30 described above and the independent virtual image light generating units 40 and 41 (the portions surrounded by one-dot dashed lines in the drawing) are arranged. In the virtual image light generating units 40 and 41, for example, virtual image video displays 42 and 43 each of which is configured with a video display such as a liquid crystal display, display driving circuits 44 and for driving the displays, and virtual image light generation projecting lens system 46 and 47 are arranged. In addition, the virtual image video displays 42 and 43 are not limited to the above-described liquid crystal display, but the virtual image video display may have any form and configuration as long as the virtual image video display is a small-sized video display such as an organic electroluminescent display (abbreviated to OLED).

On the other hand, also as illustrated in FIG. 1, two laminated transparent light-guiding plates 4 and 5 are arranged in the virtual-image-light transmitting and projecting unit 10 (a portion surrounded by a dotted line in the drawing). The light-guiding plates 4 and 5 have a function of confining and transmitting light incident on the light-guiding plate at a prescribed incident angle in the interior of the light-guiding plate by repeating total reflection on the upper and lower surfaces of the light-guiding plate. In addition, in the respective light-guiding plates 4 and 5, incident holograms 6 and 7 having a function of allowing a light wave to be incident into the light-guiding plates and outgoing holograms 8a, 8b, 9a, and 9b having a function of emitting the light wave traveling the interior of the light-guiding plates to the outside are arranged. Since the light-guiding plate having the incident holograms and the outgoing holograms is already known as an optical device for transmitting and projecting a virtual image light for an HMD, further detailed description is omitted.

In the present embodiment, a prescribed command signal or control signal from the HMD driving control circuit 30 is received, and the virtual image video displays 42 and 43 generate prescribed video light by projecting video corresponding to the display virtual image.

Figure 12:
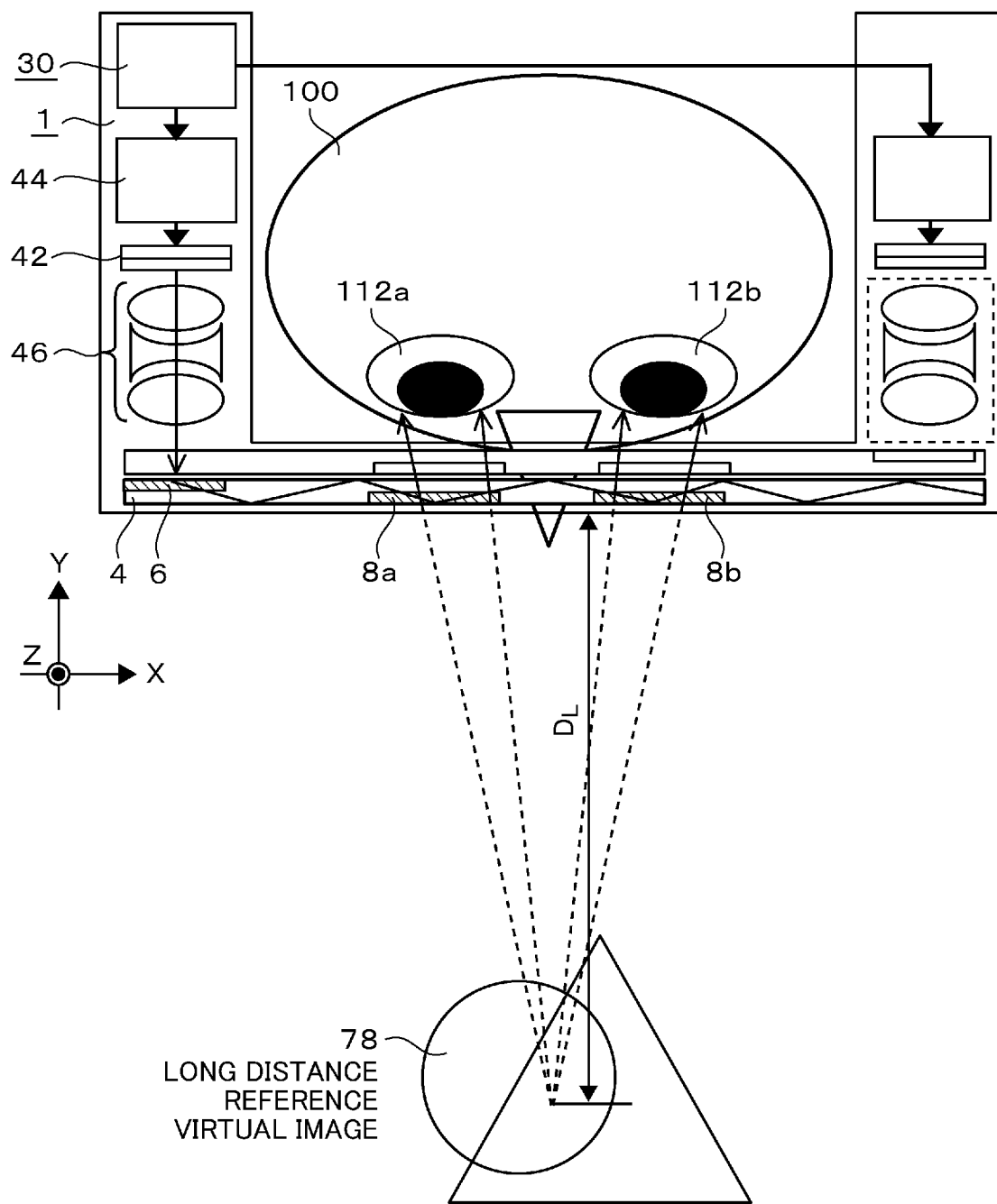
FIG. 12 is a schematic view for describing an operation outline of the virtual image light generating unit and the virtual-image-light transmitting and projecting unit of the HMD according to the first embodiment.

Then, firstly, among the video lights, a first video light generated by the display 42 is incident on the virtual image light generation projecting lens system 46 as illustrated in FIG. 12 to be converted into a virtual image light having a prescribed visual recognition distance. Then, the light is incident on the light-guiding plate 4 through the incident hologram 6 arranged on the light-guiding plate 4, travels in the light-guiding plate 4 rightward in the drawing, and is emitted from the outgoing holograms 8a and 8b, respectively, and is incident on two eyes 112a and 112b of the user 100. At this time, the user 100 visually recognizes the virtual image video 78 at the position of the prescribed visual recognition distance $D_L$ over the transparent light-guiding plates 4 and 5 by using the first virtual image light. In this specification, hereinafter, the virtual image video 78 is referred to as a long distance reference virtual image.

Figure 13:
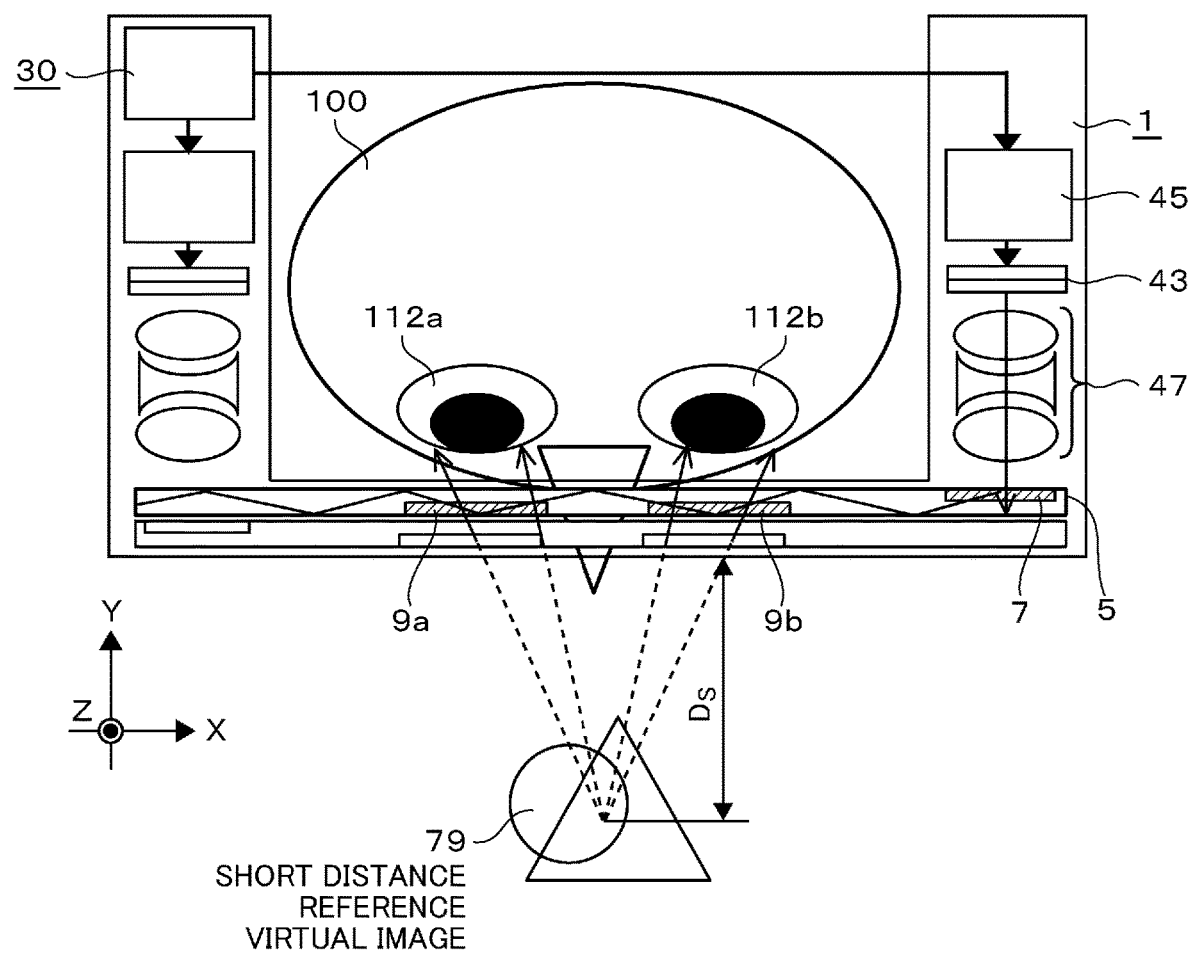
FIG. 13 is a schematic view for describing another operation outline of the virtual image light generating unit and the virtual-image-light transmitting and projecting unit of the HMD according to the first embodiment.

On the other hand, as illustrated in FIG. 13, a second video light generated by the display 43 is incident on the virtual image light generation projecting lens system 47 to be converted into a second virtual image light having a prescribed visual recognition distance. Then, the video light is incident on the interior of the light-guiding plate 5 through the incident hologram 7 arranged on the light-guiding plate 5, travels the interior of the light-guiding plate 5 to the left in the drawing, and then, is emitted from the outgoing holograms 9a and 9b to be incident on two eyes 112a and 112b of the user 100, similarly to the virtual image light emitted from the outgoing holograms 8a and 8b. At this time, the user 100 visually recognizes the virtual image video 79 at the position of the prescribed visual recognition distance $D_S$ ($D_S<D_L$) through the transparent light-guiding plates 4 and 5 by using the second virtual image light. In this specification, hereinafter, the virtual image video 79 is referred to as a short distance reference virtual image.

That is, as viewed from the user 100, optical constants and lens positions of the virtual image light generation projecting lens systems 46 and 47 are set appropriately so that the long distance reference virtual image 78 at the position of the prescribed visual recognition distance $D_L$ through the transparent light-guiding plates 4 and 5 and the short distance reference virtual image 79 at the position of the visual recognition distance $D_S$ ($D_S$<$D_L$) are accurately visually recognized.

Figure 14:
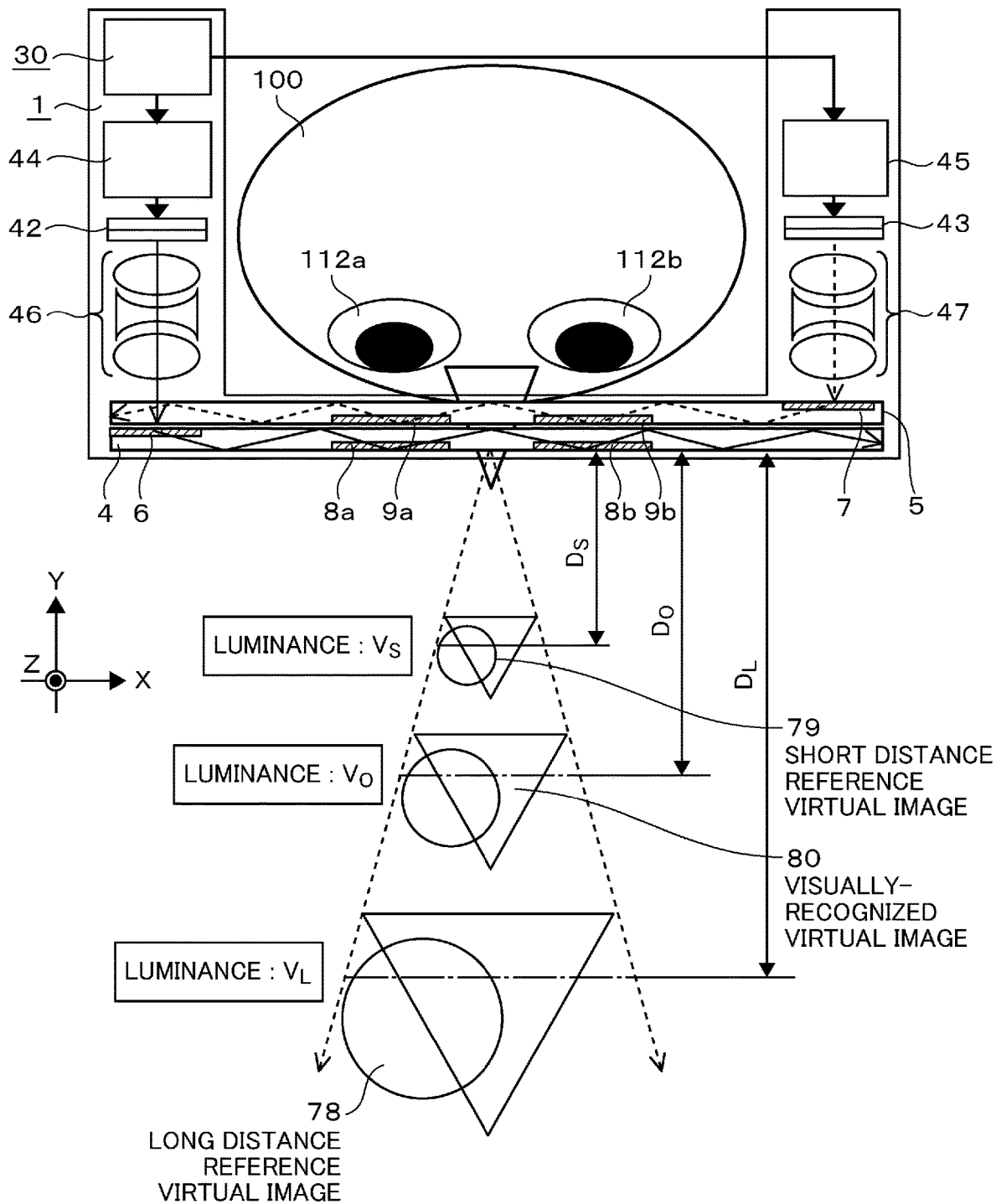
FIG. 14 is a schematic view for describing an outline of a virtual-image visual recognition distance variable control of the HMD according to the first embodiment.

In addition, as illustrated in FIG. 14, the video display positions on the virtual image video displays 42 and 43 and the visual recognition magnification of the virtual images of the virtual image light generation projecting lens system 46 and 47 are set appropriately so that the long distance reference virtual image 78 and the short distance reference virtual image 79 are superimposed and visually recognized in a perfect projection relationship. Specifically, with respect to the visual recognition magnification M of the long distance reference virtual image 78, the visual recognition magnification M' of the short distance reference virtual image 79 is set to be M'=($D_S$/$D_L$)×M.

Furthermore, in this state, when the luminances $V_L$ and $V_S$ of the long distance reference virtual image 78 and the short distance reference virtual image 79 are apportioned on the basis of the following prescribed Relational Formulas (4) and (5), the user 100 is illuded as if the virtual image is visually recognized at an arbitrary distance Do between the distances $D_L$ and $D_S$. That is, $$V_L = V_O \times (D_O - D_S)/(D_L - D_S) \quad (4)$$

$$V_S = V_O \times (D_L - D_O)/(D_L - D_S) \quad (5)$$

In addition, $V_O$ is the luminance of a virtual image that is illuded at a position of an arbitrary distance Do.

Such an illusion phenomenon is generally called a stereoscopic illusion phenomenon (depth-fused 3D: abbreviated to DFD). Since the DFD which is an event of physiology is a known event, detailed description of the physiological generation mechanism will be omitted, but in comparison with the most widely applied binocular parallax type stereoscopic vision based on illusion in the related art, in the stereoscopic vision using the DFD, it is characterized in that an observer has less feeling of fatigue and has a wider viewpoint area (eyebox) in which the stereoscopic vision can be performed correctly. In addition, in the stereoscopic vision using the DFD, since the visual recognition distance of the illusion virtual image can be adjusted to an arbitrary distance between the long and short distance reference virtual images by a relatively simple method of controlling the luminance apportionment of the long and short distance reference virtual images, this method is suitable for a case where the detection of the actual visual recognition distance of the user and the variable control of the display-virtual-image visual recognition distance adapted to the actual visual recognition distance are executed in substantially real time as in the present embodiment. Therefore, in the present embodiment, variable control of the display-virtual-image visual recognition position by using the DFD is performed.

That is, in the present embodiment, as the virtual image display device, the visual recognition distance detecting unit that detects the actual visual recognition distance to a prescribed object within the visual field of the user, the virtual image light generating unit that has a function of generating at least two types of reference virtual image light having different visual recognition distances, the virtual-image-light transmitting and projecting unit that transmits and projects the reference virtual image light to the two eyes of the user by a transparent light-guiding plate in which light wave incident/outgoing holograms are arranged, and the virtual-image visual recognition distance control unit that controls the video luminance apportionment of the two types of virtual image light according to the detected actual visual recognition distance to perform variable control of the visual recognition distance to a prescribed distance are provided.

Thus, according to the present embodiment, by performing variable control of the display-virtual-image visual recognition position by using the DFD and matching the visual recognition distance of the visually-recognized virtual image of the user with the actual visual recognition distance detected by the visual recognition distance detecting unit, the virtual image display device under a favorable visual recognition environment with reduced physiological burden of the user and the HMD using the virtual image display device can be provided. In addition, it is possible to provide a virtual image display device suitable for reducing the size and weight of the device and reducing the cost of the device.

In addition, as described above, since the variable control of the display-virtual-image visual recognition position by using the DFD is of the method of adapting the visual recognition distance of the illuded virtual image to an arbitrary distance between the long and short distance reference virtual images by controlling the luminance apportionment of the long and short distance reference virtual images, the variable control range, that is, the dynamic range is limited to the range of the visual recognition distance between the long and short distance reference virtual images. Thus, for example, by changing the visual recognition distances of the long and short distance reference virtual images themselves by using a means for mechanically adjusting the lens interval between individual projection lenses constituting the virtual image light generation projecting lens systems 46 and 47, it is also possible to arbitrarily enlarge or reduce the dynamic range of the illusion virtual-image visual recognition distance. However, even in such a case, the video display positions on the respective displays and the virtual image projection magnification of the virtual image light generation projecting lens systems 46 and 47 need to be properly controlled so that the long and short distance reference virtual images are always superimposed and visually recognized in a perfect projection relationship.

In addition, the reference virtual images that determine the dynamic range of the display-virtual-image visual recognition position variable control by the DFD are not limited to the two of the long distance reference virtual image 78 and the short distance reference virtual image 79 described above. By adding the virtual image light generating unit and the virtual-image-light transmitting and projecting unit as described above, one or a plurality of intermediate distance reference virtual images are provided at an arbitrary visual recognition distance between the longest distance reference virtual image and the shortest distance reference virtual image. By arbitrarily selecting two reference virtual images among the plurality of reference virtual images and performing the luminance apportionment control as described above as the long distance reference virtual image 78 and the short distance reference virtual image 79 again, the dynamic range of the display-virtual-image visual recognition position variable control can be arbitrarily varied.

Furthermore, the present embodiment is not limited to the display-virtual-image visual recognition position variable control by using the DFD. Of course, any means may be used as long as the present embodiment is applicable to variable control. For example, a fifth embodiment to be described later discloses an example which is applied to a display-virtual-image visual recognition position variable control by using a binocular parallax method which has been widely applied in the related art.

Second Embodiment

In the first embodiment, the means for detecting the actual visual recognition distance of the visually recognized object of the user only from convergence amounts of the pupils of the two eyes of the user as described with reference to FIGS. 9 and 10 is used, but needless to say, the actual visual recognition distance detection is not limited thereto.

Figure 16:
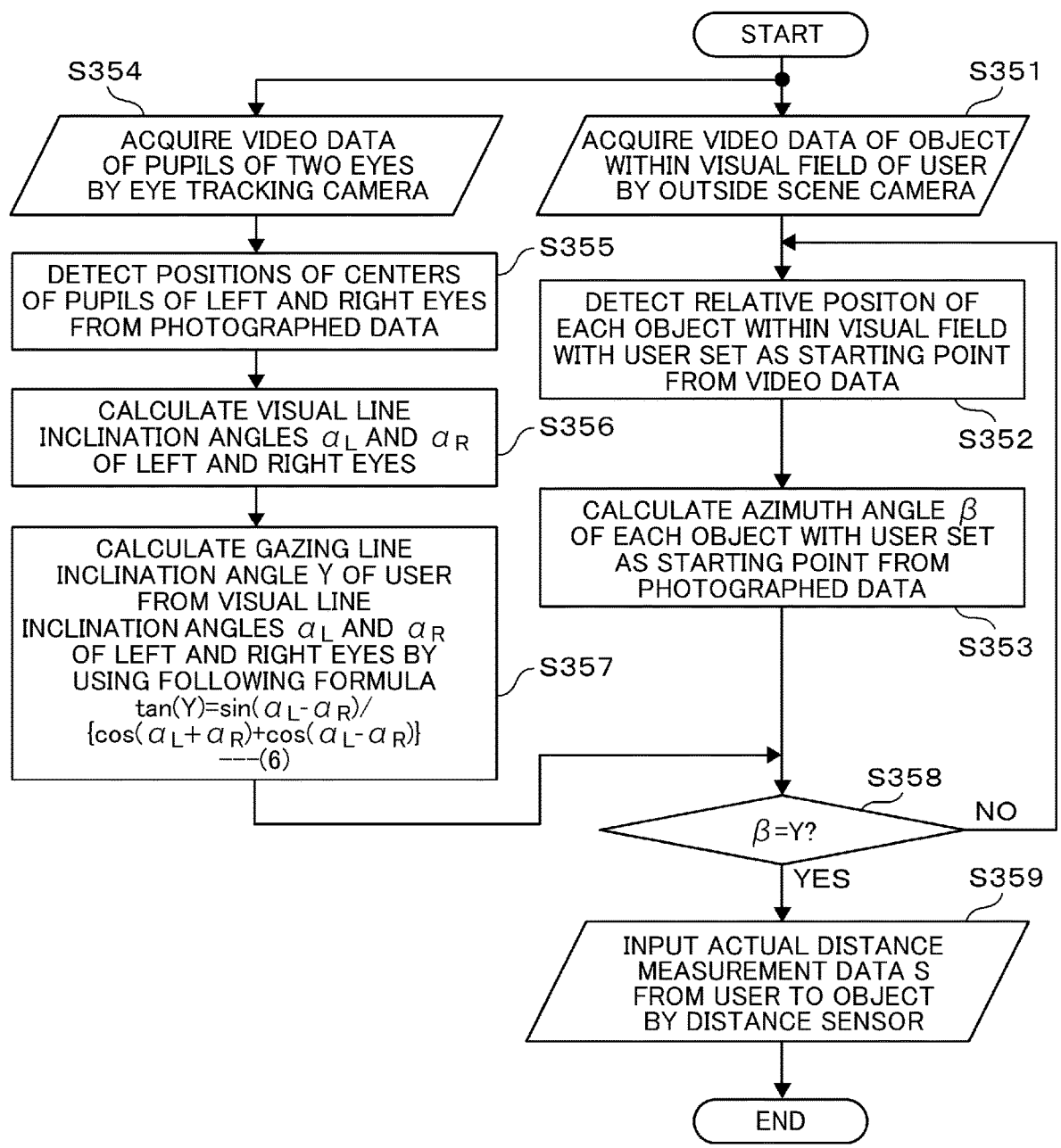
FIG. 16 is a flowchart illustrating an operation procedure of the visually-recognized-object actual visual recognition distance detecting unit of the HMD according to the second embodiment.

Hereinafter, as the present embodiment, new actual visual recognition distance detection different from the above-described detection means will be described. FIG. 15 is a schematic view for describing the detection principle, and FIG. 16 is a flowchart summarizing the detection processing procedure. First, the detection processing procedure will be described with reference to FIG. 16.

In FIG. 16, first, in step 351, each video data of the object within the visual field is acquired from the outside scene video in front of the eyes of the user photographed by the compact electronic camera 20 for photographing the outside scene video or the like. Next, in step 352, the relative position of each object within the visual field of the user with the user set as a starting point is detected from the acquired video data. Furthermore, in step 353, an azimuth angle (a prospective angle when the user is gazing at the object) β of each object within the visual field with the user set as a starting point is calculated from the detected relative position.

On the other hand, at the same time, in step 354, the photographed video data of the pupils of the two eyes of the user photographed by the eye tracking camera or the like is acquired, and in next step 355, the center positions of the pupils of the left and right eyes are detected from the video data. Then, in next step 356, the visual line inclination angles $\alpha_L$ and $\alpha_R$ of the left and right eyes are calculated (refer to FIG. 15). In addition, the procedure from step 354 to step 356 is similar to the procedure from step 301 to step 305 in the first embodiment relating to the detection of the actual visual recognition distance of the user described with reference to FIGS. 9 and 10.

In the present embodiment, in next step 357, a gazing line inclination angle γ of the user 100 (refer to FIG. 15) toward the gazing point 120 on the visually recognized object at which the user is currently gazing is calculated by using the following Relational Formula (6) from the visual line inclination angles $\alpha_L$ and $\alpha_R$ of the left and right eyes calculated in the above-described procedure.

$$\tan(\gamma) = \sin(\alpha_L - \alpha_R)/\{\cos(\alpha_L + \alpha_R) + \cos(\alpha_L - \alpha_R)\} \quad (6)$$

Next, in step 358, by comparing the azimuth β of the object within the visual field with the user set as a starting point calculated in the above-described procedure with the gazing line inclination angle γ of the user, the object within the visual field in which β and γ match with each other, that is, the object that the user is currently gazing at is identified. Then, an effective distance S to the specified gazing object, that is, the actual visual recognition distance of the user at the present time is measured by using a distance measuring sensor provided in the HMD. In addition, as the distance measuring sensor, any existing distance measuring sensor such as a so-called stereo camera, a TOF sensor, or an ultrasonic sensor introduced in FIG. 1 may be used.

By the way, the first and second embodiments described so far have been intended only to detect the actual visual recognition distance of the HMD user and to adapt the display virtual image to the actual visual recognition distance, but needless to say, the present invention is not limited thereto.

For example, regardless of whether or not the user is gazing, a display means that realizes so-called augmented reality (AR) compatibility by detecting all the effective distances from the user for all the objects that are visible within the visual field of the user and by adapting the visual recognition distance of the individual display virtual images superimposed and displayed in association with the respective objects to the effective distances of the respective relevant actual objects may be used.

Furthermore, regardless of the effective distance of each object within the visual field or the actual visual recognition distance of the user at all, the virtual image may be displayed at any visual recognition distance, a display method in which the visual recognition position of the display virtual image dynamically changes between arbitrary visual recognition distances by utilizing the visual recognition distance variable control of the display virtual image in real time may be used.

Third Embodiment

FIG. 17 is a plan view illustrating a schematic configuration of a virtual image light generating unit and a virtual-image-light transmitting and projecting unit of an HMD according to the present embodiment. In addition, in FIG. 17, the same components as those illustrated in FIG. 11 are denoted by the same reference numerals.

In FIG. 11, two independent virtual image light generating units 40 and 41 are arranged in the HMD to separately generate the long distance reference virtual image light and the short distance reference virtual image light. In addition, the virtual-image-light transmitting and projecting unit 10 is configured with two transparent light-guiding plates 4 and 5 arranged to be laminated, and the virtual image light generated by each of the virtual image light generating units 40 and 41 is configured to transmit the interior of one light-guiding plate of the light-guiding plates 4 and 5. However, a configuration in which the long distance reference virtual image light and the short distance reference virtual image light are not separately transmitted in separate light-guiding plates but are transmitted together in a single light-guiding plate may be used. In addition, by contriving the optical system, it is also possible to integrate the two independent virtual image light generating units as described above into one. The present embodiment illustrated in FIG. 17 is an embodiment that has achieved such an object.

First, as illustrated in FIG. 17, the HMD 1 according to the present embodiment is different from that of the first embodiment illustrated in FIG. 11 in that the HMD 1 has only a single virtual image light generating unit 40 (a portion surrounded by a one-dot dashed line in the drawing). The virtual image light generating unit 40 includes a virtual image video display 42, a display driving circuit 44 for driving the virtual image video display 42, first and second virtual image light generation projecting lens systems 46a and 46b divided into two lens groups, a trapezoidal polarizing beam splitter (PBS) 49, a polarization conversion element 48 having a function of appropriately converting the polarization direction of the incident light into mutually perpendicular P-polarized light and S-polarized light on the basis of a prescribed electric signal, and the like. In addition, as the polarization conversion element, an existing device such as a liquid crystal polarization conversion element used in a liquid crystal display may be used.

In addition, in the present embodiment, only a single light-guiding plate 4 is arranged in the virtual-image-light transmitting and projecting unit 10 (a portion surrounded by a dotted line in the drawing). Furthermore, the light-guiding plate 4 is provided with two incident holograms 6 and 7 and two outgoing holograms 8a and 8b.

In the present embodiment, first, the long distance reference virtual image light video and the short distance reference virtual image light video are alternately switched and displayed at a prescribed frame rate on the virtual image video display 42. Then, the generated video light is incident on the first virtual image light generation projecting lens system 46a, where the light is converted into the virtual image light having a prescribed visual recognition distance, for example, the long distance reference virtual image light having the visual recognition distance $D_L$, and after that, the light is incident on the polarization conversion element 48. The polarization conversion element 48 is set to switch the incident light to the P-polarized light or the S-polarized light in synchronization with the display switching of the long distance reference virtual image light video and the short distance reference virtual image light video displayed on the display 42.

Now, by the polarization conversion element 48, the virtual image light incident on the polarization conversion element 48 is converted into P-polarized light, for example, at the timing when the long distance reference virtual image light video is displayed on the display 42, and the virtual image light incident on the polarization conversion element 48 is converted into S-polarized light, reversely, at the timing when the short distance reference virtual image light video is displayed. In addition, hereinafter, the virtual image light converted into the P-polarized light is referred to as first virtual image light, and the virtual image light converted into the S-polarized light is referred to as second virtual image light.

Then, as illustrated in FIG. 18, the first virtual image light converted into the P-polarized light (the polarization direction indicated by bidirectional arrows in the drawing) by the polarization conversion element 48 passes through a polarization splitting film 49a of the trapezoidal PBS 49 and is incident on the interior of the light-guiding plate 4 through the first incident hologram 6 arranged on the light-guiding plate 4. Then, after traveling in the light-guiding plate 4 in the rightward direction in the drawing, the light is emitted from the outgoing holograms 8a and 8b and is incident on the two eyes 112a and 112b of the user 100, respectively.

At this time, since the first virtual image light is generated as light corresponding to the long distance reference virtual image light by the first virtual image light generation projecting lens system 46a, the user 100 visually recognizes the long distance reference virtual image 78 at a prescribed visual recognition magnification at the position of the prescribed visual recognition distance $D_L$ through the transparent light-guiding plate 4.

Figure 19:
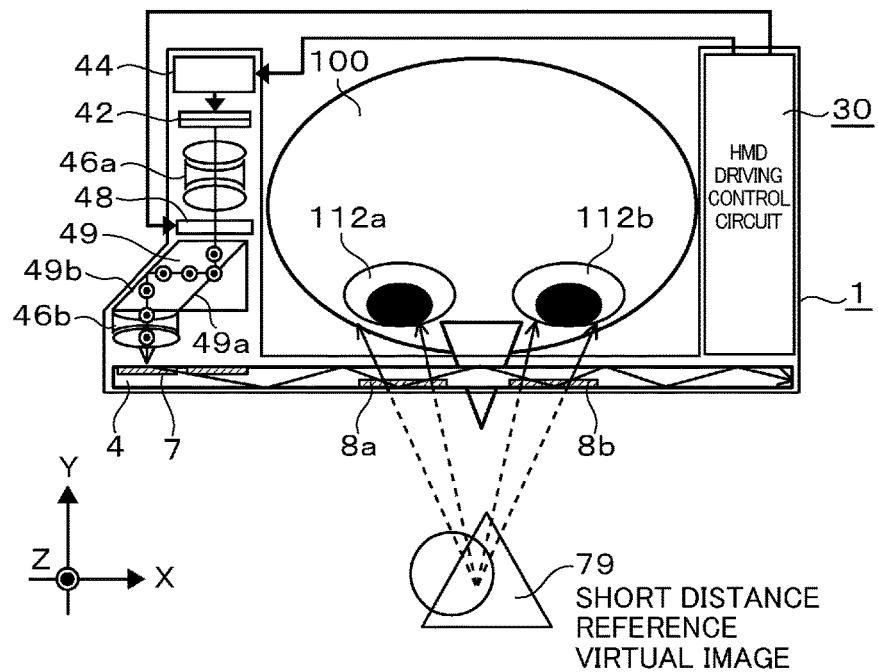
FIG. 19 is a schematic view for describing another operation outline of the virtual image light generating unit and the virtual-image-light transmitting and projecting unit of the HMD according to the third embodiment.

On the other hand, as illustrated in FIG. 19, the second virtual image light converted into the S-polarized light having a polarization direction perpendicular to that of the P-polarized light by the polarization conversion element 48 is reflected by the polarization splitting film 49a of the trapezoidal PBS 49, after that, is further reflected on a total reflection surface 49b, follows an optical path different from that of the first virtual image light, and is incident on the second virtual image light generation projecting lens system 46b. The second virtual image light generation projecting lens system 46b has a function of reconverting the second virtual image light once generated as the light corresponding to the long distance reference virtual image light by the first virtual image light generation projecting lens system 46a into the light corresponding to the short distance reference virtual image light having a prescribed visual recognition distance $D_S$ ($D_S < D_L$).

Then, the second virtual image light reconverted into the light corresponding to the short distance reference virtual image light is incident on the interior of the light-guiding plate 4 through the second incident hologram 7 arranged on the light-guiding plate 4 next. Then, similarly to the case of the first virtual image light, after traveling in the light-guiding plate 4 to the right in the drawing, the light is emitted from the outgoing holograms 8a and 8b and is incident on the two eyes 112a and 112b of the user 100, respectively. At this time, since the second virtual image light passes through both the virtual image light generation projecting lens systems 46a and 46b as described above and is converted into the virtual image light corresponding to the short distance reference virtual image light, the user 100 visually recognizes the short distance reference virtual image 79 at a prescribed visual recognition magnification at the position of the prescribed visual recognition distance $D_S$ through the transparent light-guiding plate 4.

That is, the user 100 alternately visually recognizes the long distance reference virtual image 78 and the short distance reference virtual image 79 switched at a prescribed frame rate, but the user 100 cannot identify the individual virtual images switching at a high rate, so that the user 100 perceives the virtual images as if the long distance reference virtual image 78 and the short distance reference virtual image 79 are visually recognized simultaneously. Therefore, similarly to the first and second embodiments, it is possible to perform a display-virtual-image visual recognition distance variable control by using a stereoscopic illusion phenomenon (DFD).

As described above, by employing the configuration illustrated in the present embodiment, the light-guiding plates in the virtual image light generating unit and the virtual-image-light transmitting and projecting unit can be integrated and reduced, and thus, it is possible to obtain great effects of reducing the size, weight, and cost of the HMD in comparison with the first embodiment.

In addition, needless to say, the relationship between the long/short distance reference virtual image light and the P/S-polarized light described in the present embodiment may be completely opposite to each other. In this case, the first virtual image light generation projecting lens system 46a has a function of generating the light corresponding to the short distance reference virtual image light, and the second virtual image light generation projecting lens system 46b has a function of further reconverting the light into the light corresponding to the long distance reference virtual image light.

Fourth Embodiment

Figure 20:
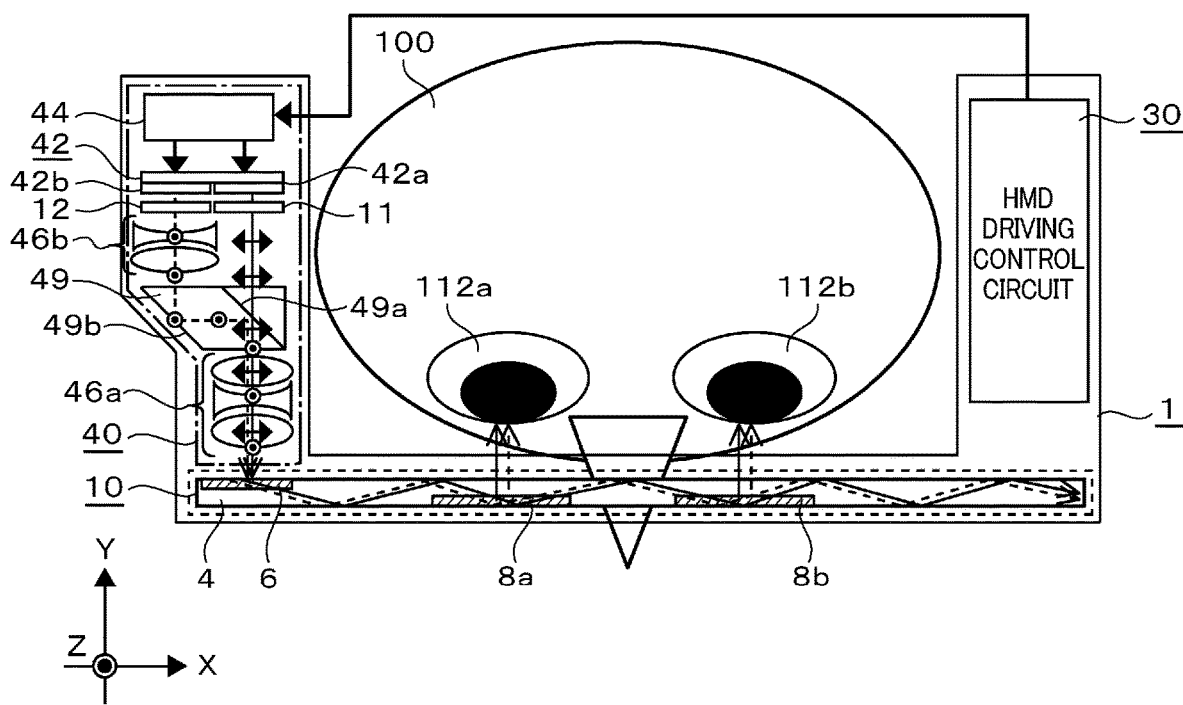
FIG. 20 is a plan view illustrating a schematic configuration of a virtual image light generating unit and a virtual-image-light transmitting and projecting unit of an HMD according to a fourth embodiment.

FIG. 20 is a plan view illustrating a schematic configuration of a virtual image light generating unit and a virtual-image-light transmitting and projecting unit of an HMD according to the present embodiment. In addition, in FIG. 20, the same components as those illustrated in FIGS. 11 and 17 are denoted by the same reference numerals.

In the third embodiment, by using a single virtual image video display, the long distance reference virtual image light video and the short distance reference virtual image light video are switched and displayed in a time-division manner at a prescribed frame rate, and the polarization direction of the virtual image light generated in synchronization with the frame rate is also switched in a time-division manner, so that the user 100 is allowed to perceive the virtual image as if the long distance reference virtual image and the short distance reference virtual image are visually recognized simultaneously. On the other hand, in the present embodiment, not the time-division display as described above, but the configuration in which the long and short reference virtual image lights are simultaneously projected to the two eyes 112*a* and 112*b* of the user 100 is employed.

In addition, in the present embodiment, similarly to FIG. 17, only a single light-guiding plate 4 is arranged in the virtual-image-light transmitting and projecting unit 10 (a portion surrounded by a dotted line in the drawing). Then, the light-guiding plate 4 is provided with one incident hologram 6 and two outgoing holograms 8*a* and 8*b*.

In the present embodiment, in the virtual image video display 42 inside the virtual image light generating unit 40, the video display surface is divided into two display areas 42*a* and 42*b*, and independent videos or the same videos of which luminance apportionment can be independently controlled for each display item can be simultaneously displayed in each display area. Furthermore, immediately after each display area, phase plates or polarizing filters 11 and 12 are arranged. The phase plates or the polarizing filters 11 and 12 have a function of aligning the polarization directions of the video light emitted from the respective divided display areas 42*a* and 42*b* of the display 42 with prescribed polarization directions. That is, the phase plate or the polarizing filter aligns the first video light emitted from the divided display area 42*a* with P-polarized light (the polarization direction indicated by bidirectional arrows in the drawing), and the polarizing filter 12 aligns the second video light emitted from the divided display area 42*b* with S-polarized light perpendicular to the P-polarized light.

Therefore, for example, the video corresponding to the long distance reference virtual image light is displayed in the divided display area 42*a*, and simultaneously, the video corresponding to the short distance reference virtual image light is displayed in the divided display area 42*b*.

First, the first video light emitted from the divided display area 42*a* is incident on the trapezoidal PBS 49 through the phase plate or the polarizing filter 11, and since the polarization direction of the first video light is aligned with that of the P-polarized light by the phase plate or the polarizing filter 11 as described above, the first video light passes through the polarization splitting film 49*a* of the trapezoidal PBS 49 and is incident on the first virtual image light generation projecting lens system 46*a*. Then, after the long distance reference virtual image light having the visual recognition distance $D_L$ is generated, the light is incident on the interior of the light-guiding plate 4 through the incident hologram 6 arranged on the light-guiding plate 4. Then, after traveling in the light-guiding plate 4 to the right in the drawing, the light is emitted from the outgoing holograms 8*a* and 8*b* and is incident on the two eyes 112*a* and 112*b* of the user 100, respectively.

On the other hand, the second video light emitted from the divided display area 42*b* is incident on the trapezoidal PBS 49 through the phase plate or the polarizing filter 12 and the second virtual image light generation projecting lens system 46*b*, is reflected by the total reflection surface 49*b*, and after that, reaches the polarization splitting film 49*a*. At this time, since the polarization direction of the second video light is aligned with that of the S-polarized light by the phase plate or the polarizing filter 12, the second video light is reflected by the polarization splitting film 49*a* and combined with the optical path of the first video light, similarly, to be incident on the first virtual image light generation projecting lens system 46*a*. That is, the second video light passes through both the second virtual image light generation projecting lens system 46*b* and the first virtual image light generation projecting lens system 46*a* with the trapezoidal prism 49 interposed therebetween, and thus, a short distance reference virtual image light having a visual recognition distance $D_S$ is generated by the combination of the two lens systems. Then, similarly to the long distance reference virtual image light generated from the first video light, the short distance reference virtual image light is incident on the interior of the light-guiding plate 4 through the incident hologram 6 arranged on the light-guiding plate 4, travels in the light-guiding plate 4 in the right direction in the drawing, and after that, is emitted from the outgoing holograms 8*a* and 8*b* and is incident on the two eyes 112*a* and 112*b* of the user 100, respectively.

That is, with the configuration of the present embodiment as described above, the user 100 can visually recognize the long distance reference virtual image light and the short distance reference virtual image light simultaneously. Therefore, similarly to the first, second, and third embodiments, the display-virtual-image visual recognition distance variable control using the stereoscopic illusion phenomenon (DFD) can be performed.

Since the configuration illustrated in the present embodiment does not require the high-speed switching control of the video light and the relatively expensive optical device such as a polarization conversion element as illustrated in the third embodiment, it is possible to obtain further great effect of reducing the cost of the HMD.

In addition, needless to say, the relationship between the long/short distance reference virtual image light and the P/S-polarized light described in the present embodiment may be completely opposite to each other. In this case, the first virtual image light generation projecting lens system 46*a* has a function of generating the light corresponding to the short distance reference virtual image light, and a combined projecting lens system of the first virtual image light generation projecting lens system 46*a* and the second virtual image light generation projecting lens system 46*b* has a function of generating the light corresponding to long distance reference virtual image light.

Fifth Embodiment

In the fourth embodiment, an example is described in which the stereoscopic illusion phenomenon (DFD) is used as the display-virtual-image visual recognition distance variable control. However, with substantially the same optical configuration, an HMD using the most generally-used binocular parallax method of the related art as the display-virtual-image visual recognition distance variable control can also be realized. In the present embodiment, an example in which the present invention is applied to a binocular parallax type HMD will be described.

Figure 21:
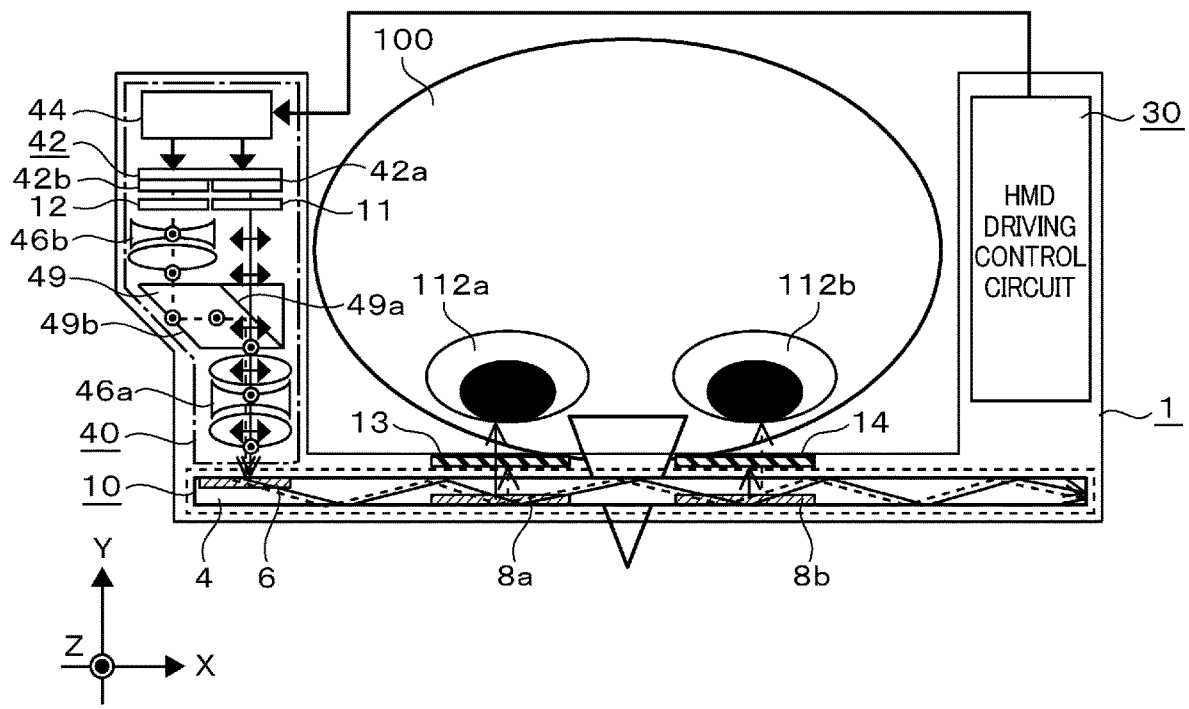
FIG. 21 is a plan view illustrating a schematic configuration of a virtual image light generating unit and a virtual-image-light transmitting and projecting unit of an HMD according to a fifth embodiment.

FIG. 21 is a plan view illustrating a schematic configuration of a virtual image light generating unit and a virtual-image-light transmitting and projecting unit of an HMD according to the present embodiment. In addition, in FIG. 21, the same components as those illustrated in FIG. 20 are denoted by the same reference numerals.

In FIG. 21, similarly to those in FIG. 20, a virtual image light generating unit and a virtual-image-light transmitting and projecting unit are provided. The present embodiment is different only in that a polarizing filter 13 is additionally arranged in the optical path between the outgoing hologram 8a and the right eye 112a of the user 100, and a polarizing filter 14 is additionally arranged in the optical path between the outgoing hologram 8b and the left eye 112b of the user 100. Among the filters, the polarizing filter 13 has a function of transmitting, for example, P-polarized light (the polarization direction indicated by bidirectional arrows in the drawing) and reflecting or absorbing S-polarized light, and on the contrary, the polarizing filter 14 has a function of transmitting S-polarized light and reflecting or absorbing P-polarized light. However, needless to say, the combination of the P/S-polarized light may be exactly the opposite.

With such a configuration, only the virtual image light generated from the display image of the divided display area 42a of the display 42 can be allowed to be incident on the right eye 112a of the user 100 to be visually recognized, and only the virtual image light generated from the display image of the divided display area 42b can be allowed to be incident on the left eye 112b of the user 100 to be visually recognized. Therefore, by displaying the right-eye video and the left-eye video having the video item display position shift corresponding to the binocular parallax according to the desired visual recognition distance in the divided display areas 42a and 42b, respectively, it is possible to realize the display-virtual-image visual recognition distance variable control by the binocular parallax method. In addition, the specific procedure, principle, and the like of the binocular parallax method are already well-known, and thus, detailed description thereof will be omitted.

However, in the optical configuration of the present embodiment illustrated in FIG. 21, the first video light emitted from the divided display area 42a of the display 42 and the second video light emitted from the divided display area 42b are different in terms of the optical path length of reaching the first virtual image light generation projecting lens system 46a. (The second video light emitted from the divided display area 42b is longer by the optical path from the total reflection surface 49b in the trapezoidal PBS 49 to the polarization splitting film 49a.) For this reason, with respect to the virtual image generated by the first virtual image light generation projecting lens system 46a, the first virtual image light generated from the first video light and the second virtual image generated from the second video light are different in terms of the visual recognition distance and the visual recognition video magnification.

However, in the case of performing the display-virtual-image visual recognition distance variable control by the binocular parallax method, the visual recognition distances and video sizes of the virtual image video visually recognized with the right eye and the virtual image video visually recognized with the left eye need to be completely matched with each other. Therefore, in the present embodiment, the second virtual image light generation projecting lens system 46b has a function of correcting a difference in a visual recognition distance and visual recognition video magnification of the second virtual image light to the first virtual image light caused by the difference in optical path length. With such an optical configuration, also in the present embodiment, the visual recognition distances and the video sizes of the virtual image video visually recognized with the right eye and the virtual image video visually recognized with the left eye can be matched with each other, so that the display-virtual-image visual recognition distance variable control by the binocular parallax method can be realized.

In the binocular parallax type HMD using the optical configuration illustrated in the present embodiment, unlike the binocular parallax type HMD of the related art, there is no need to be equipped with two separate independent virtual image light generating units for the left and right eyes, that is, video display optical engines, it is possible to obtain great effects of reducing the size, weight, and cost of the binocular parallax type HMD.

By the way, in the present embodiment, an example in which the optical configuration of the fourth embodiment illustrated in FIG. 20 is applied to the binocular parallax type HMD is illustrated. However, needless to say, with respect to the optical configuration of the third embodiment illustrated in FIG. 17, a binocular parallax type HMD having the same effect can be realized by installing entirely the same filter as the polarizing filter.

Sixth Embodiment

Figure 22:
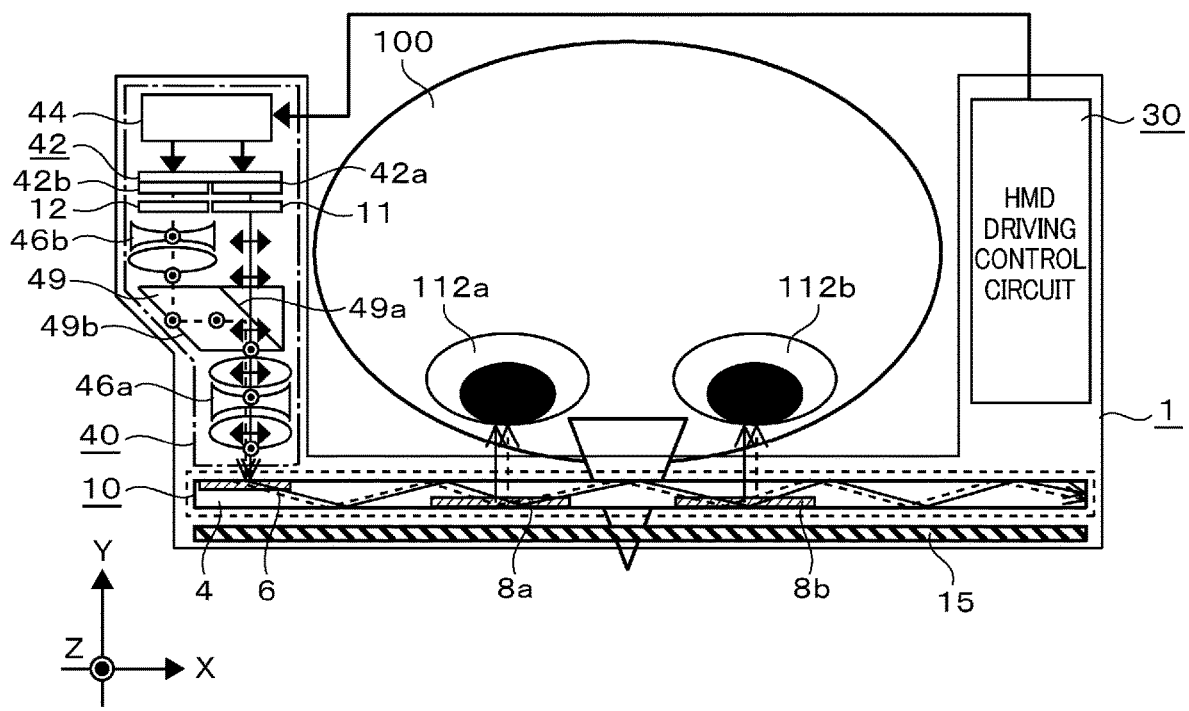
FIG. 22 is a plan view illustrating a schematic configuration of a virtual image light generating unit and a virtual-image-light transmitting and projecting unit of an HMD according to a sixth embodiment.

FIG. 22 is a plan view illustrating a schematic configuration of a virtual image light generating unit and a virtual-image-light transmitting and projecting unit of an HMD according to the present embodiment. In addition, in FIG. 22, the same components as those in the fourth embodiment illustrated in FIG. 20 and the fifth embodiment illustrated in FIG. 21 are denoted by the same reference numerals.

Also in the present embodiment, the HMD 1 has the virtual image light generating unit and the virtual-image-light transmitting and projecting unit similarly to the fourth embodiment illustrated in FIG. 20. The present embodiment is different only in that a light-shielding property controllable device 15 which is an optical device capable of controlling the light-shielding property by a prescribed electric signal is additionally arranged on the front surface of the light-guiding plate 4. As an optical device capable of controlling the light-shielding property, there may be exemplified an active polarizing filter using liquid crystal and a light control glass. By arranging such an optical device on the front surface of the light-guiding plate 4, outside scene light that jumps into the left and right eyes of the user 100 over the eyes of the user through the light-guiding plate 4 can be arbitrarily shielded, so that only the display virtual image can be clearly visually recognized in front of the eyes of the user. By providing such a function, a so-called augmented reality (AR)-compatible HMD in which an actual visually recognized image and a display virtual image can be combined and visually recognized and a so-called virtual reality (VR)-compatible HMD in which only a display virtual image is visually recognized by shielding the outside scene can be arbitrarily switched and used with one HMD by the user, so that it is possible to obtain a great effect of expanding the versatility of the HMD.

In addition, in FIG. 22, the light-shielding property controllable device 15 is arranged so as to cover the entire surface of the light-guiding plate 4, but the light-shielding property controllable device 15 may be arranged so as to cover only the openings of the outgoing holograms 8a and 8b and the vicinity thereof.

Seventh Embodiment

Each of the embodiments described so far is an example mainly relating to an HMD, but the present embodiment is an example in which the present invention is applied to a portable information terminal or a portable personal computer (PC) 16 having a transparent display.

Figure 23:
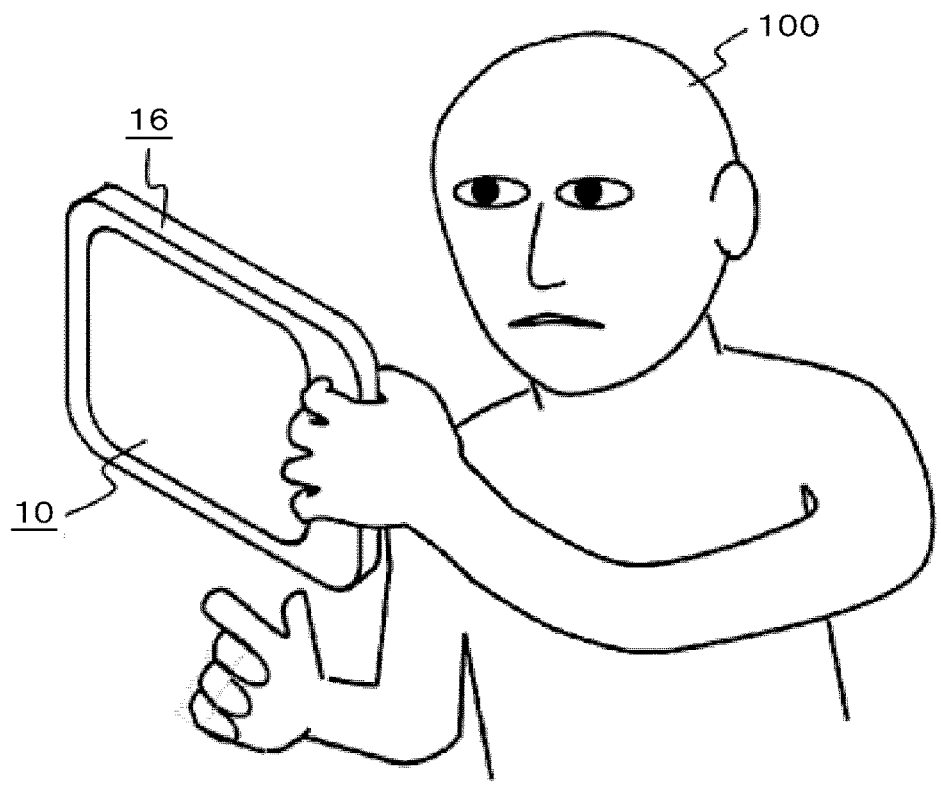
FIG. 23 is a schematic perspective view illustrating a use scene of a portable information terminal according to a seventh embodiment.

FIG. 23 is a schematic perspective view illustrating a use scene of the portable information terminal according to the present embodiment. As illustrated in FIG. 23, the driving control circuit and the virtual image light generating unit disclosed in at least any one of the first to sixth embodiments are incorporated in the main body of the portable terminal or the portable PC 16, and as a see-through video display, a virtual-image-light transmitting and projecting unit 10 including the light-guiding plate 4 with incident and outgoing holograms of the virtual image light as illustrated in FIGS. 11, 17, and 20 to 22 is provided. By applying the present invention to a portable terminal or a portable PC as described above, unlike a head-mounted type HMD, augmented reality (AR) or virtual reality (VR) can be realized by the portable device.

Eighth Embodiment

Figure 24:
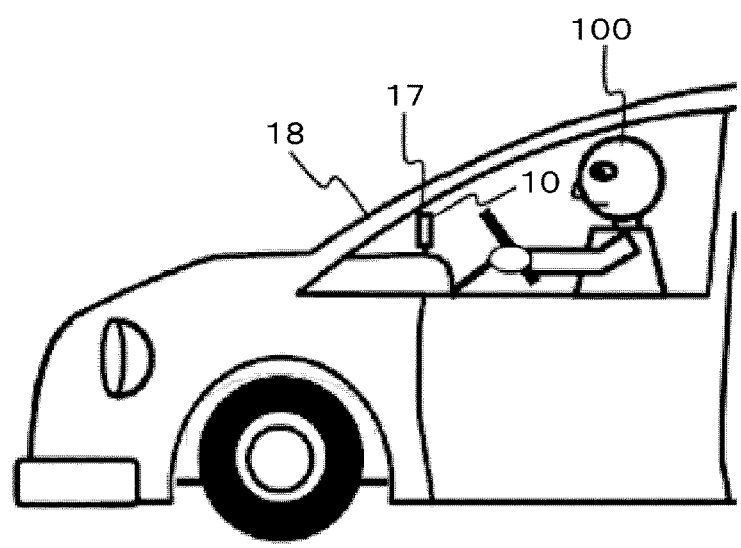
FIG. 24 is a schematic front view illustrating a use scene of a vehicle head-up display according to an eighth embodiment.

FIG. 24 illustrates an embodiment in which the present invention is applied to an in-vehicle head-up display (HUD). In this example, at least the driving control circuit and the virtual image light generating unit disclosed in any one of the first to sixth embodiments are incorporated in an HUD main body 17 incorporated in the dashboard of a vehicle or mounted on the dashboard, and as a so-called HUD combiner or an HUD see-through display, the virtual-image-light transmitting and projecting unit 10 including the light-guiding plate 4 with incident and outgoing holograms of the virtual image light is provided.

In addition, the virtual-image-light transmitting and projecting unit 10 may be provided on a portion or the entire surface of the windshield glass provided on the entire surface of the driver's seat, or the windshield glass itself may be partially formed with the light-guiding plate 4 with the incident and outgoing holograms of the virtual image light, so that the windshield glass itself can be allowed to have a function of a see-through display for the HUD.

REFERENCE SIGNS LIST

1 HMD
4, 5 Light-guiding plate
6, 7 Incident hologram
8a, 8b, 9a, 9b Outgoing hologram
10 Virtual-image-light transmitting and projecting unit
20 Compact electronic camera for photographing outside scene video
30 Driving control circuit
34 Visually-recognized-object actual visual recognition distance detecting unit
35 Virtual-image visual recognition distance control unit
40, 41 Virtual image light generating unit
42, 43 Virtual image video display
46, 47 Virtual image light generation projecting lens system
49 Trapezoidal PBS (polarizing beam splitter)
50 Portable information terminal
100 User

The invention claimed is:

1. A virtual image display device comprising:
a first display and a second display configured to respectively generate a first virtual image light and a second virtual image light in which visual recognition distances are different;
a projector configured to project the first virtual image light and the second virtual image light to left and right eyes of the user so that the user visually recognizes each of a long distance reference virtual image and a short distance reference virtual image; and
a controller configured to:
control a position and a size of the first virtual image light and the second virtual image light so that the long distance reference virtual image and the short distance reference virtual image which are visually recognized by the user are overlapped, and
control a ratio of luminance of the long distance reference virtual image and the short distance reference virtual image according to a visual recognition distance of a visually-recognized-virtual image based on the long distance reference virtual image and the short distance reference visual image, a visual recognition distance of the long distance reference virtual image, and a visual recognition distance of the short distance reference virtual image,
wherein, in a case where the visual recognition distance of the visually-recognized-virtual image is set as D0, a luminance of the visually-recognized-virtual image is set as V0, the visual recognition distance of the long distance reference virtual image is set as DL, a luminance of the long distance reference virtual image is set as VL, the visual recognition distance of the short distance reference virtual image is set as DS, and a luminance of the short distance reference virtual image is set as VS, the controller controls a ratio of the luminance of the long distance reference virtual image and the luminance of the short distance reference virtual image based on the following formulas:

$$VL=V0*(D0-DS)/(DL-DS); \text{ and}$$

$$VS=V0*(DL-D0)/(DL-DS).$$

2. The virtual image display device according to claim 1 wherein the controller is configured to detect visual line inclination angles of the left and right eyes from convergence amounts at centers of pupils of the left and right eyes of the user and to calculate an actual visual recognition distance from the user to an object at which the user is gazing at based on the visual line inclination angles.

3. The virtual image display device according to claim 2, wherein the controller is configured to match the visual recognition distance of the visually-recognized-virtual image with the actual visual recognition distance.

4. The virtual image display device according to claim 1, wherein
the first virtual image light and the second virtual image light have polarization directions that are substantially perpendicular, and
wherein respective optical paths of the first virtual image light and the second virtual image light are separated or combined by a first polarizing beam splitter and a second polarizing beam splitter, respectively, which are respectively disposed in the respective optical paths.

5. The virtual image display device according to claim 1, wherein the projector is configured to include one or a plurality of laminated light-guiding plates, and each of the plurality of light-guiding plates is provided with an incident hologram which allows a light wave to be incident on each of the light-guiding plates and an outgoing hologram which emits a light wave traveling in the light-guiding plate to the outside.

6. The virtual image display device according to claim 1, wherein the virtual image display device is a head mounted display device.

7. The virtual image display device according to claim 1,
wherein the first display is a first liquid crystal display,
wherein the second display is a second liquid crystal display.

8. The virtual image display device according to claim 1,
wherein the first display is a first organic electroluminescent display,
wherein the second display is a second organic electroluminescent display.

9. The virtual image display device according to claim 1, further comprising:
a first display driving circuit that drives the first display;
a second display driving circuit that drives the second display;
a first lens on which the first virtual image light is incident thereon; and
a second lens on which the second virtual image light is incident thereon.

* * * * *